(12) United States Patent
Nishio et al.

(10) Patent No.: US 8,770,865 B2
(45) Date of Patent: Jul. 8, 2014

(54) SUSPENSION BOARD WITH CIRCUIT

(75) Inventors: Hajime Nishio, Osaka (JP); Noriyuki Juni, Osaka (JP)

(73) Assignee: Nitto Denko Corporation, Osaka (JP)

( * ) Notice: Subject to any disclaimer, the term of this patent is extended or adjusted under 35 U.S.C. 154(b) by 645 days.

(21) Appl. No.: 12/929,347

(22) Filed: Jan. 18, 2011

(65) Prior Publication Data
US 2011/0194809 A1 Aug. 11, 2011

(30) Foreign Application Priority Data
Feb. 5, 2010 (JP) .................................... 2010-24814

(51) Int. Cl.
G02B 6/12 (2006.01)
G02B 6/26 (2006.01)

(52) U.S. Cl.
USPC .................................. 385/89; 385/14; 385/52

(58) Field of Classification Search
USPC .......................................... 385/50–53, 88–89
See application file for complete search history.

(56) References Cited

U.S. PATENT DOCUMENTS

| | | | |
|---|---|---|---|
| 5,659,646 A | 8/1997 | Vinchant et al. | |
| 6,028,973 A | 2/2000 | Schienle et al. | |
| 8,351,743 B2 * | 1/2013 | Naito et al. | 385/14 |
| 2004/0208453 A1 * | 10/2004 | Jacobowitz et al. | 385/50 |
| 2005/0276547 A1 * | 12/2005 | Wang et al. | 385/92 |
| 2007/0264872 A1 * | 11/2007 | Kuroda et al. | 439/581 |
| 2011/0091152 A1 | 4/2011 | Nishio | |
| 2011/0122738 A1 | 5/2011 | Hirata et al. | |

FOREIGN PATENT DOCUMENTS

| | | |
|---|---|---|
| JP | H03-243904 | 10/1991 |
| JP | H05-249331 | 9/1993 |
| JP | 07-142699 | 6/1995 |
| JP | H07-253515 | 10/1995 |
| JP | H10-300959 | 11/1998 |
| JP | 2000-066048 | 3/2000 |
| JP | 2002-311267 | 10/2002 |
| JP | 2005-092032 | 4/2005 |
| JP | 2006-201298 | 8/2006 |
| JP | 2010-015664 | 1/2010 |
| JP | 2010-129141 | 6/2010 |
| JP | 2011-086353 | 4/2011 |

* cited by examiner

*Primary Examiner* — Eric Wong
(74) *Attorney, Agent, or Firm* — Edwards Neils PLLC; Jean C. Edwards, Esq.

(57) ABSTRACT

A suspension board with circuit includes a circuit board and an optical waveguide provided in the circuit board. The optical waveguide is provided with a first optical waveguide having a curved portion and a secondary optical waveguide having a linear portion. The first optical waveguide includes a first under clad layer, a first core layer formed on the first under clad layer and included in the first under clad layer when projected in the thickness direction, and a first over clad layer formed on the first under clad layer so as to cover the first core layer. The secondary optical waveguide includes a secondary under clad layer, a secondary core layer formed on the secondary under clad layer, and a secondary over clad layer formed on the secondary core layer and included in the secondary core layer when projected in the thickness direction.

6 Claims, 15 Drawing Sheets

FIG. 6
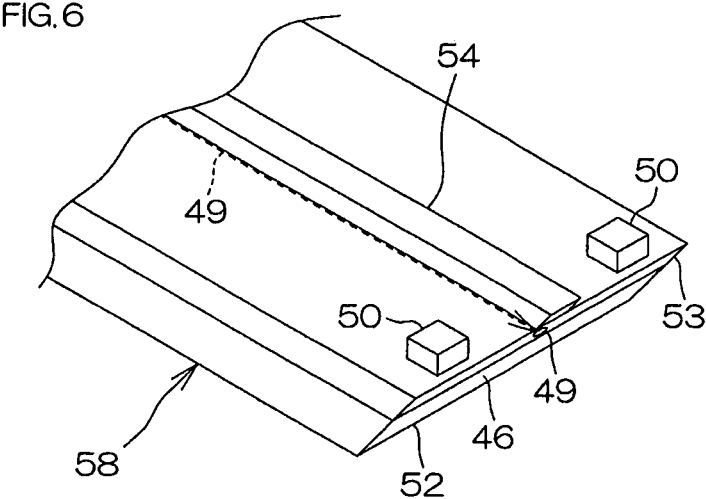
8(7)
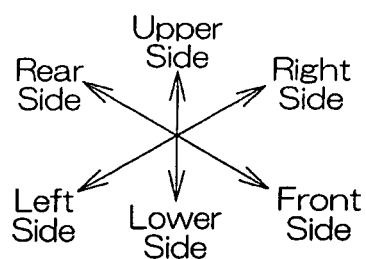

FIG. 7
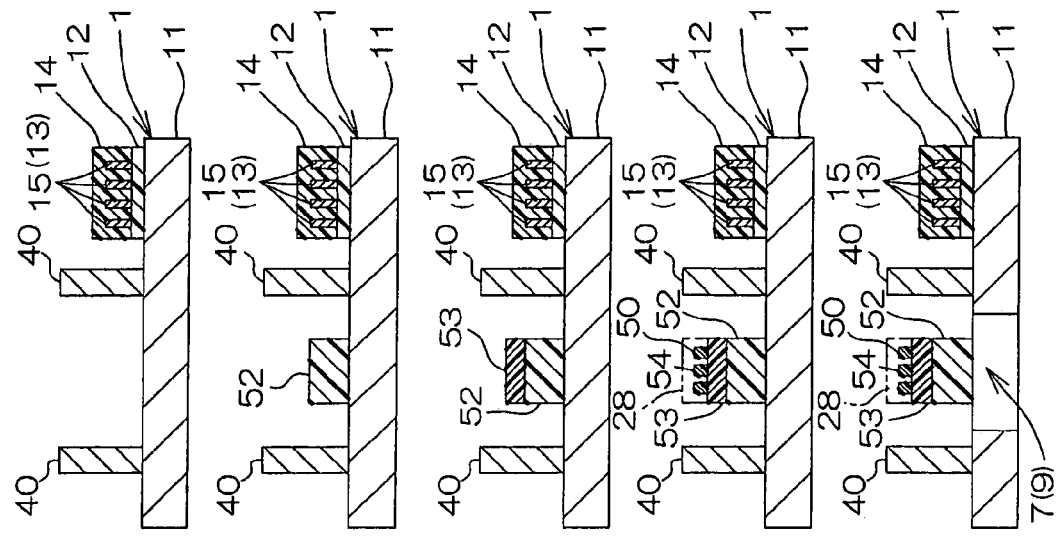
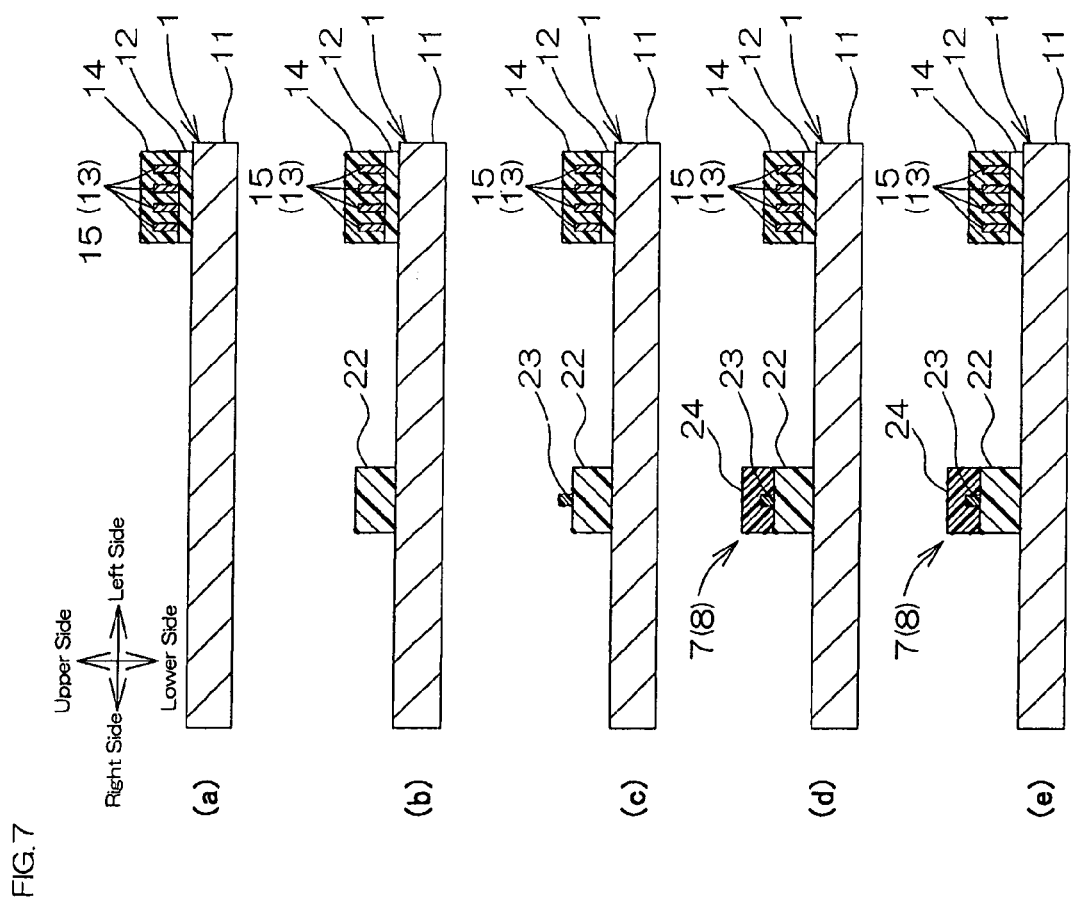

Rear Side ⟵⟶ Front Side

SUSPENSION BOARD WITH CIRCUIT

CROSS-REFERENCE TO RELATED APPLICATION

The present application claims priority from Japanese Patent Application No. 2010-24814 filed on Feb. 5, 2010, the contents of which are herein incorporated by reference into this application.

BACKGROUND OF THE INVENTION

1. Field of the Invention

The present invention relates to a suspension board with circuit. More particularly, the present invention relates to a suspension board with circuit mounted on a hard disk drive which adopts an optical assist system.

2. Description of Related Art

In recent years, an optical assist system (an optical assist magnetic recording system) has been known as a magnetic recording system for a hard disk drive or the like. For example, as a suspension board with circuit which adopts the optical assist system, providing an optical waveguide on a suspension has been known.

As such an optical waveguide, an embedded optical waveguide in which a core layer (an optical waveguide) is embedded in a clad layer (an over clad layer and an under clad layer), and a loaded optical waveguide in which an over clad layer is laminated (loaded) on a core layer with its width narrower than the width of the core layer have been known.

There has been proposed that, for example, an embedded optical waveguide is formed in a linear shape and a loaded optical waveguide is formed in a curved shape, and these are connected to each other on a board (cf. Japanese Unexamined Patent Publication No. H07-142699).

SUMMARY OF THE INVENTION

However, while the loaded optical waveguide is capable of transmitting a light with high intensity, the transmitted light relatively easily leaks compared with the light of the embedded optical waveguide. Specifically, in the loaded optical waveguide, a light relatively easily leaks into the core layer exposed from the over clad layer in the core layer under the over clad layer.

Thus, in the case where the optical waveguide is required to be formed in a curved shape in response to the shape of the board, when the loaded optical waveguide is formed in such a shape, the light leaks much more easily into the core layer exposed from the over clad layer. Thus, this leads to an increase in a loss of light.

It is an object of the present invention to provide a suspension board with circuit capable of reducing a loss of light transmitted through an optical waveguide, and capable of arranging an optical waveguide with its appropriate shape in response to the shape of the suspension board with circuit.

The suspension board with circuit of the present invention includes a circuit board including a metal supporting board, an insulating layer formed on the metal supporting board, and a conductive layer formed on the insulating layer; and an optical waveguide provided in the circuit board, wherein the optical waveguide is provided with a first optical waveguide having a curved portion and a secondary optical waveguide having a linear portion, wherein the first optical waveguide includes a first under clad layer, a first core layer formed on the first under clad layer and included in the first under clad layer when projected in the thickness direction of the first under clad layer, and a first over clad layer formed on the first under clad layer so as to cover the first core layer, and wherein the secondary optical waveguide includes a secondary under clad layer, a secondary core layer formed on the secondary under clad layer, and a secondary over clad layer formed on the secondary core layer and included in the secondary core layer when projected in the thickness direction of the secondary core layer.

In the suspension board with circuit of the present invention, it is preferable that at least the first optical waveguide is formed from a flexible material, and further the secondary optical waveguide is formed from a flexible material.

In the suspension board with circuit of the present invention, it is preferable that the optical waveguide extends in the lengthwise direction, and the curved portion curves in an orthogonal direction with respect to the lengthwise direction and the thickness direction thereof, and the radius of curvature thereof is 100 mm or less.

In the suspension board with circuit of the present invention, it is preferable that the length in the orthogonal direction of the end edge at the secondary optical waveguide side of the first core layer is 5 μm or less, and the length in the orthogonal direction at the first optical waveguide side of the secondary over clad layer is 25 μm or more.

In the suspension board with circuit of the present invention, it is preferable that the first optical waveguide and the secondary optical waveguide are optically connected in the lengthwise direction by arranging these next to each other in the lengthwise direction, and the end portion at the secondary optical waveguide side of the first core layer is formed in a state that the length in the widthwise direction thereof becomes narrower as coming closer to the secondary optical waveguide when projected in the thickness direction, and the end portion at the first optical waveguide side of the secondary over clad layer is formed in a state that the length in the widthwise direction thereof becomes larger as coming closer to the first optical waveguide when projected in the thickness direction.

According to the suspension board with circuit of the present invention, in the first optical waveguide including a curved portion, the first core layer is included in the first under clad layer and is covered with the first over clad layer. That is, the first optical waveguide including a curved portion is made of an embedded optical waveguide, so that a loss of light can be reduced in the first core layer.

In the secondary optical waveguide including a linear portion, the secondary over clad layer is formed on the secondary core layer and is included in the secondary core layer when projected in the thickness direction of the secondary core layer. That is, the secondary optical waveguide including a linear portion is made of a loaded optical waveguide, so that a light can be transmitted with high intensity, whereas a loss of light in the secondary core layer can be reduced.

Therefore, while allowing to be arranged corresponding to the shape of the circuit board, the information can be recorded on a hard disk at high density, thereby allowing to efficiently perform the optical assist system.

BRIEF DESCRIPTION OF THE DRAWINGS

FIG. 6 is an enlarged perspective view of the front end portion of the secondary optical waveguide in the suspension board with circuit shown in FIG. 3;

FIG. 7 is a sectional view illustrating the method of producing the suspension board with circuit, and the left side view is a sectional view, taken along the line A-A in FIG. 3 and the right side view is a sectional view, taken along the line B-B in FIG. 3, (a) showing the step of preparing a circuit board,
(b) showing the step of forming a first under clad layer and a secondary under clad layer,
(c) showing the step of forming a first core layer and a secondary core layer,
(d) showing the step of forming a first over clad layer and a secondary over clad layer, and
(e) showing the step of forming an opening;

DETAILED DESCRIPTION OF PREFERRED EMBODIMENTS

Figure 1:
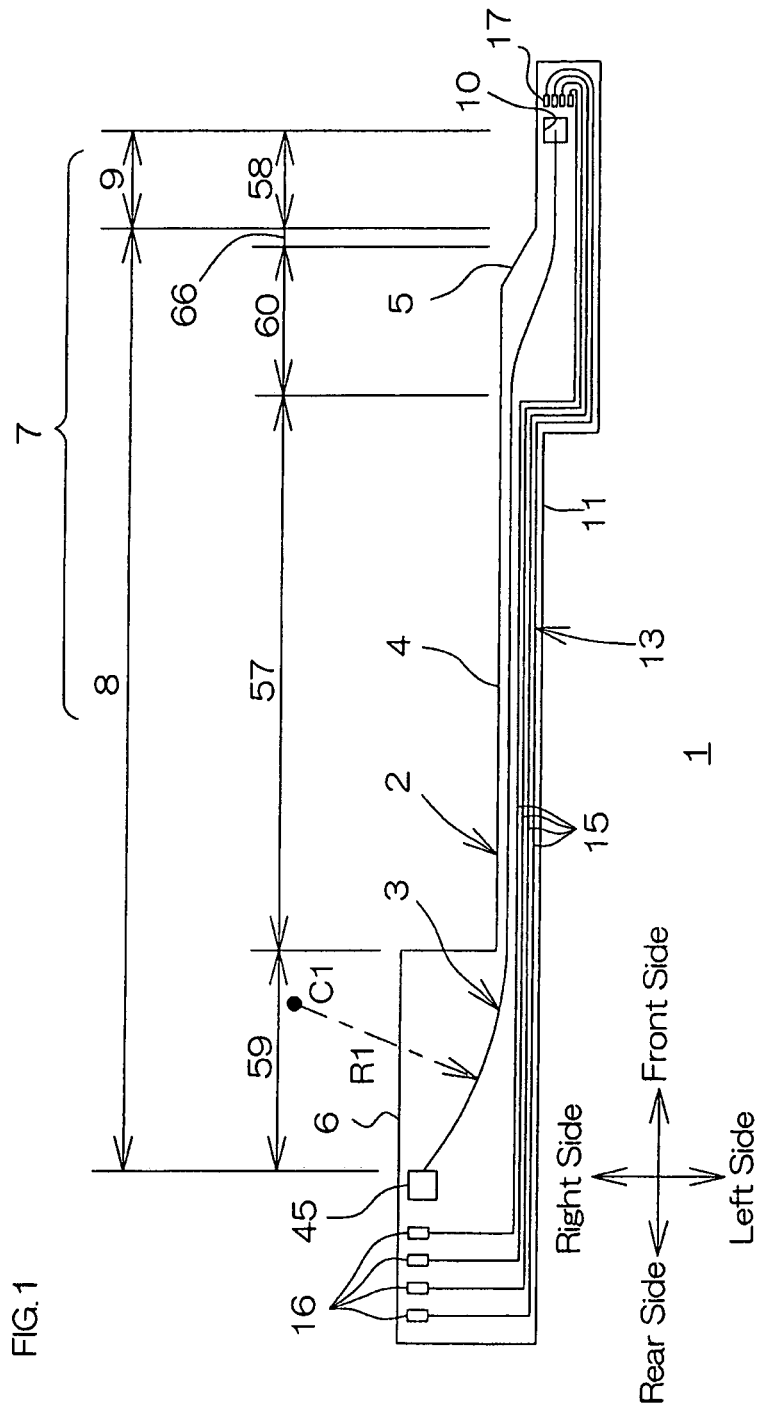
FIG. 1 is a plan view illustrating a suspension board with circuit of an embodiment according to the present invention.
Figure 2:
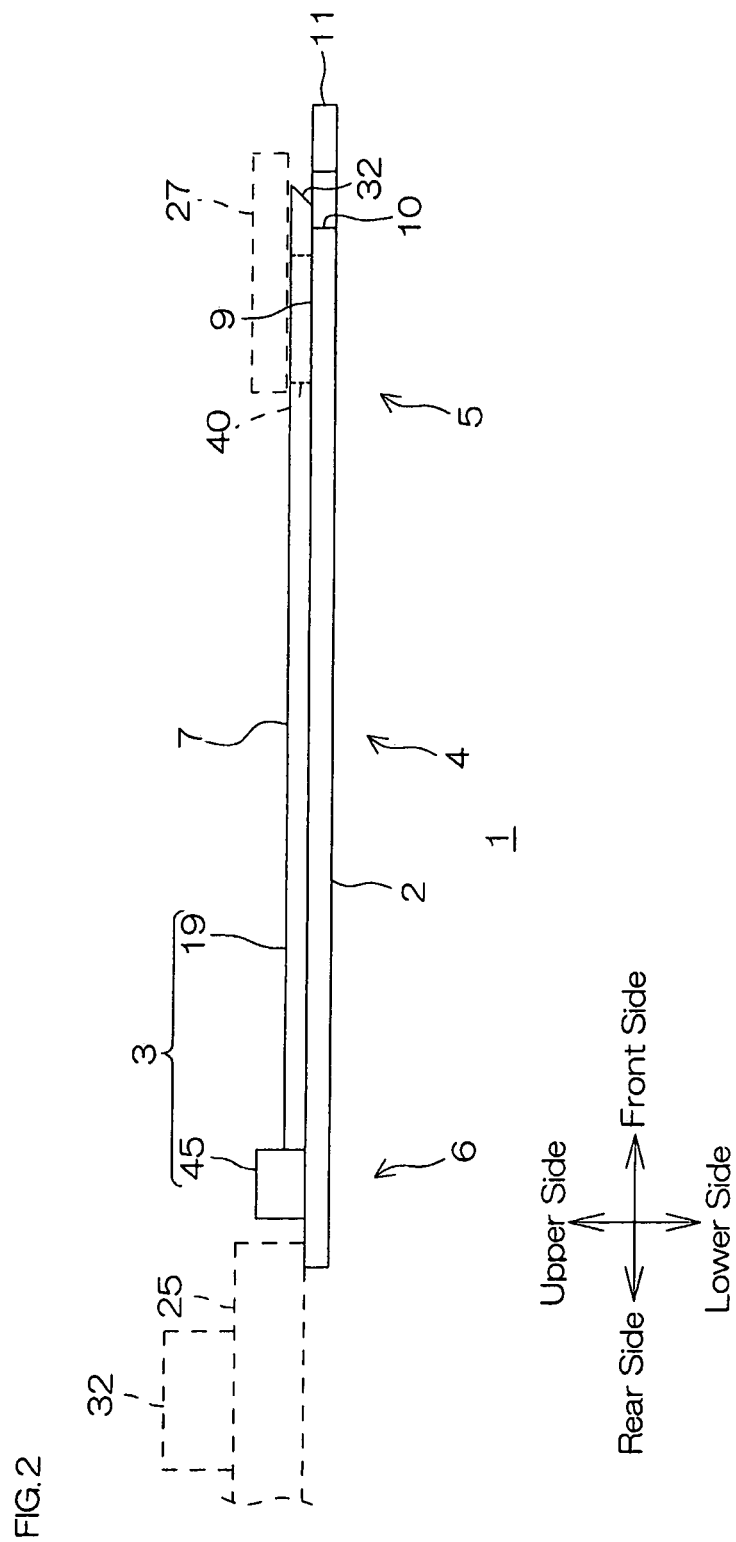
FIG. 2 is a sectional view, taken along an optical waveguide of the suspension board with circuit shown in FIG. 1.
Figure 3:
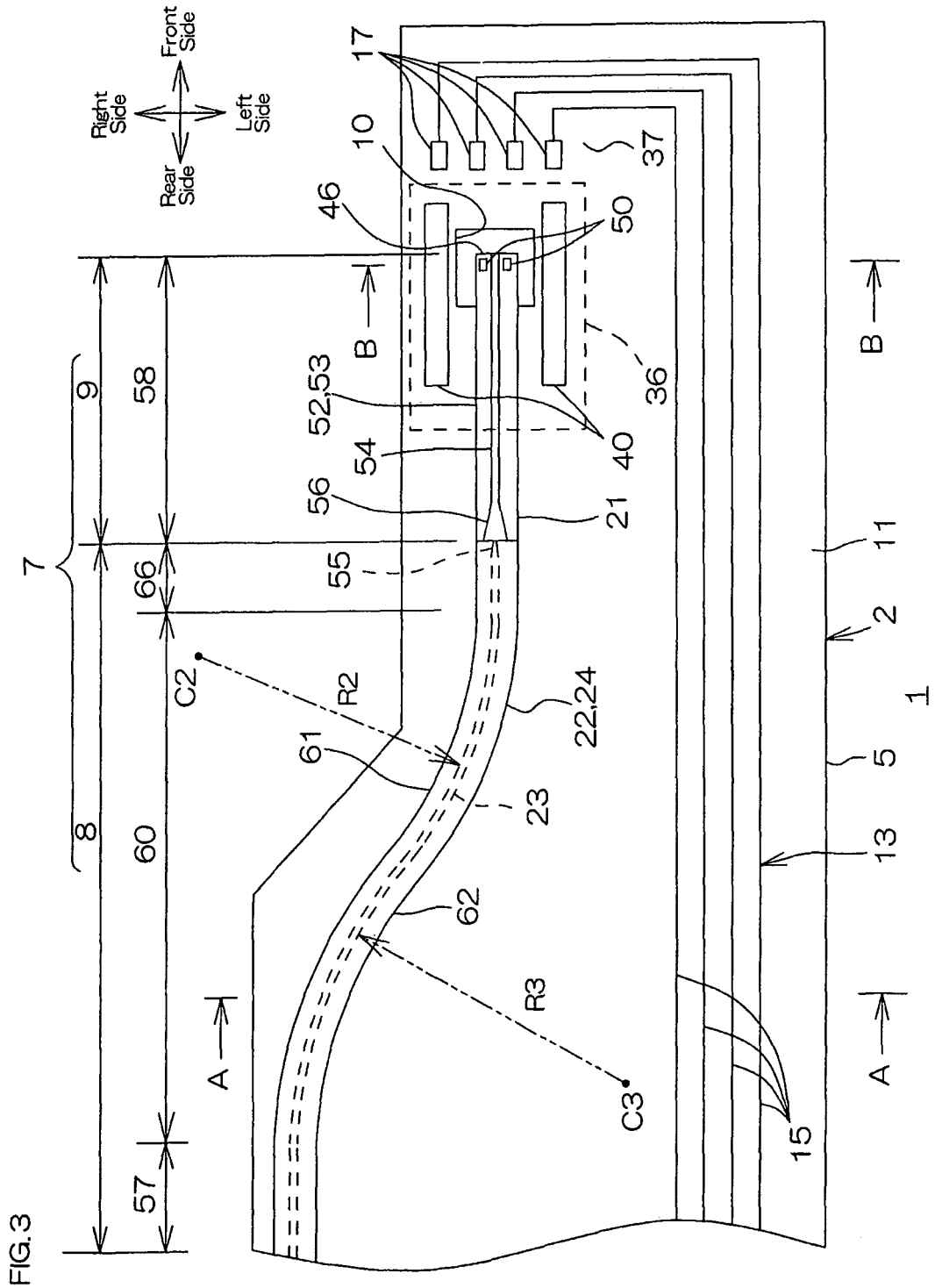
FIG. 3 is an enlarged sectional view of the front end portion of the suspension board with circuit shown in FIG. 1.
Figure 4:
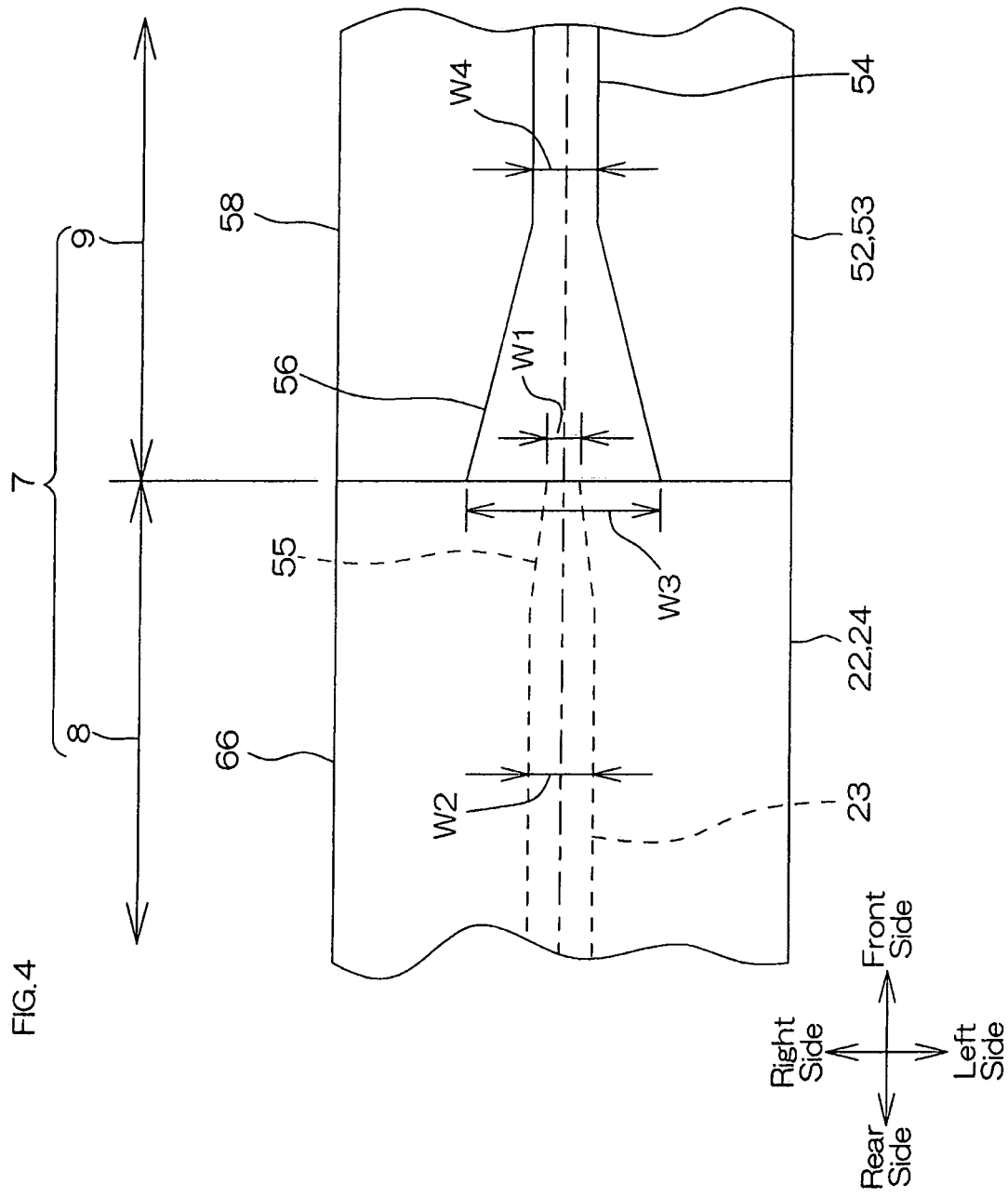
FIG. 4 is an enlarged plan view illustrating the connecting condition of a first optical waveguide and a secondary optical waveguide in the suspension board with circuit shown in FIG. 3.
Figure 5:
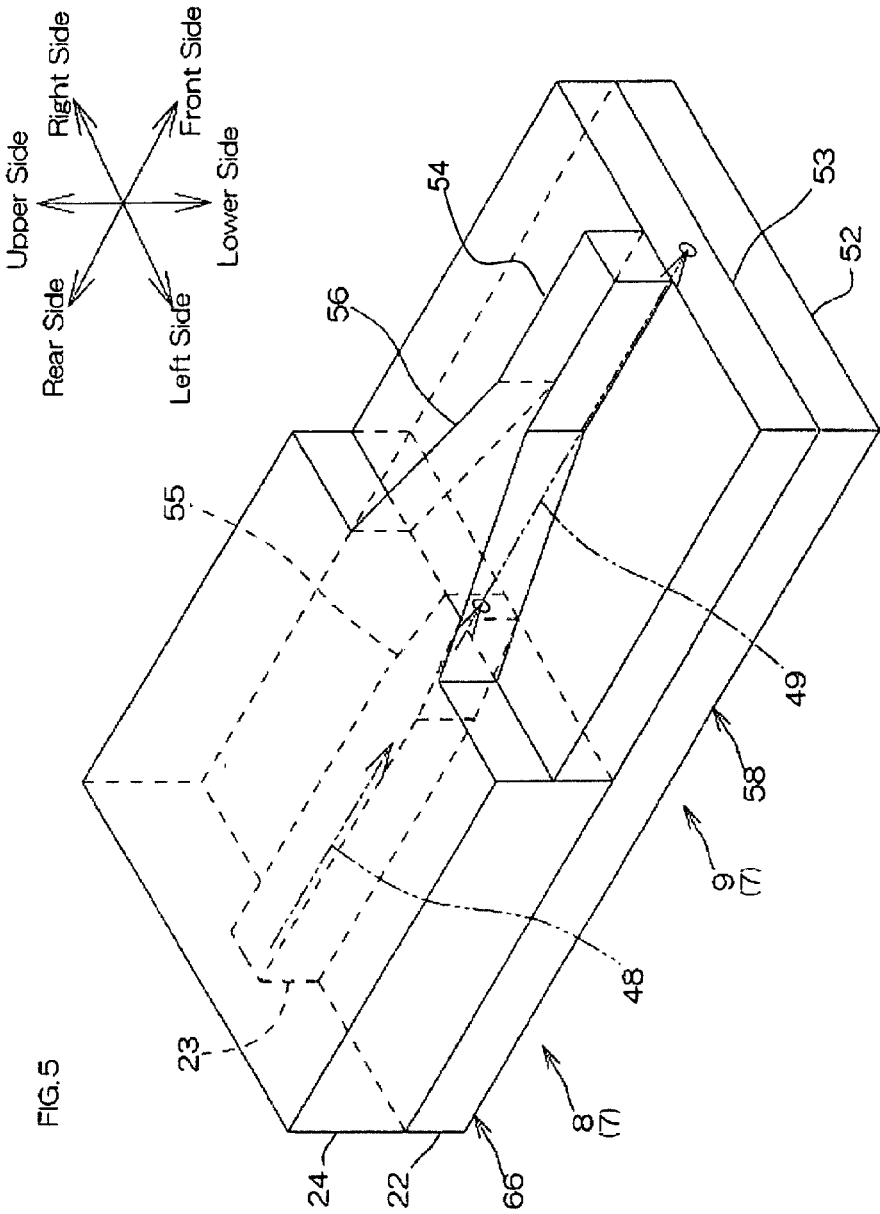
FIG. 5 is an enlarged perspective view illustrating the connecting condition shown in FIG. 4.
Figure 8:
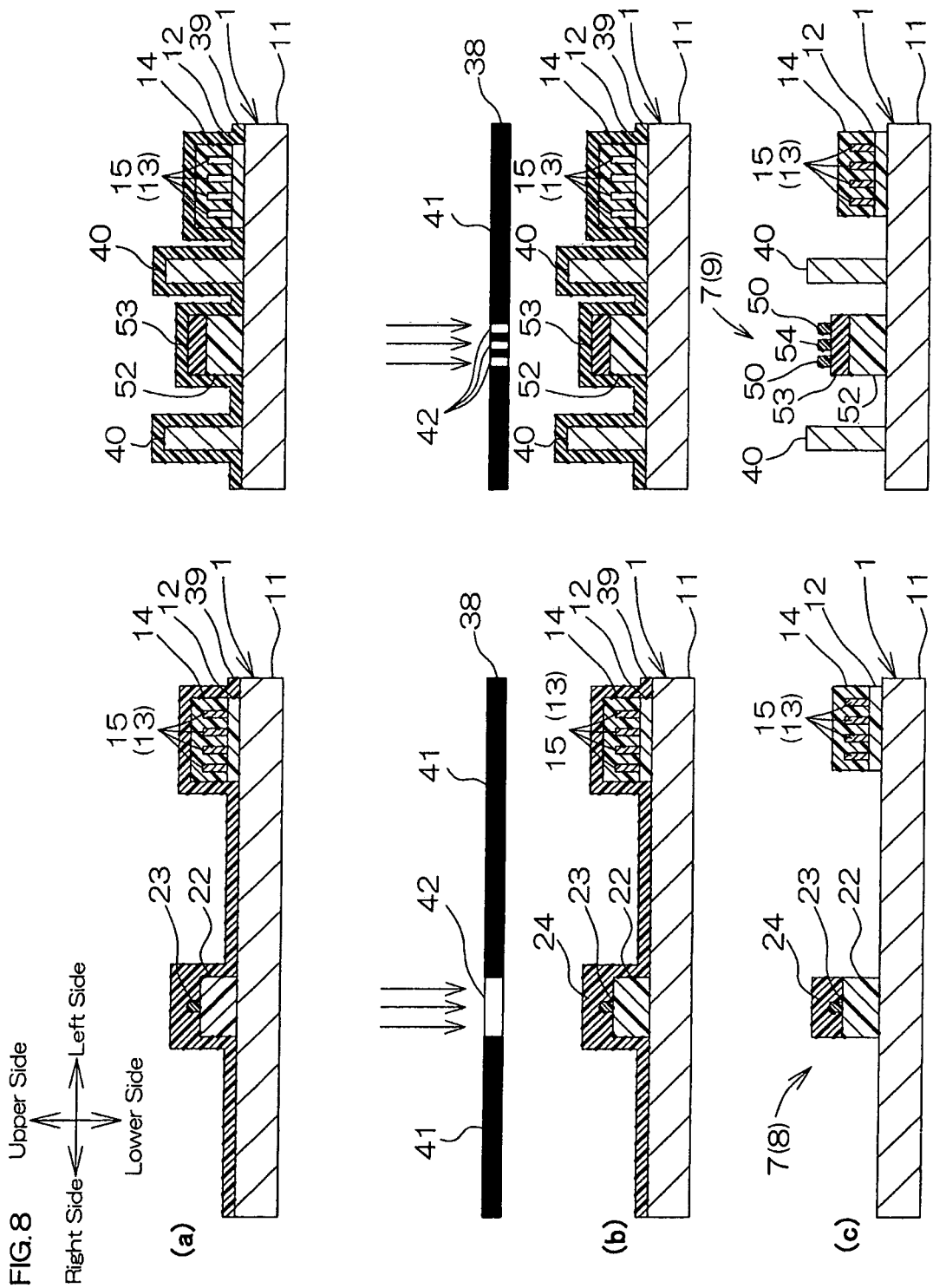
FIG. 8 is a sectional view illustrating the step of forming the first over clad layer and the secondary over clad layer shown in FIG. 7(d), and the left side view is a sectional view, taken along the line A-A in FIG. 3 and the right side view is a sectional view, taken along the line B-B in FIG. 3, (a) showing the step of forming a photosensitive coating,
(b) showing the step of exposing the coating to light via a photomask, and
(c) showing the step of developing the coating to form the first over clad layer and the secondary over clad layer.
Figure 9:
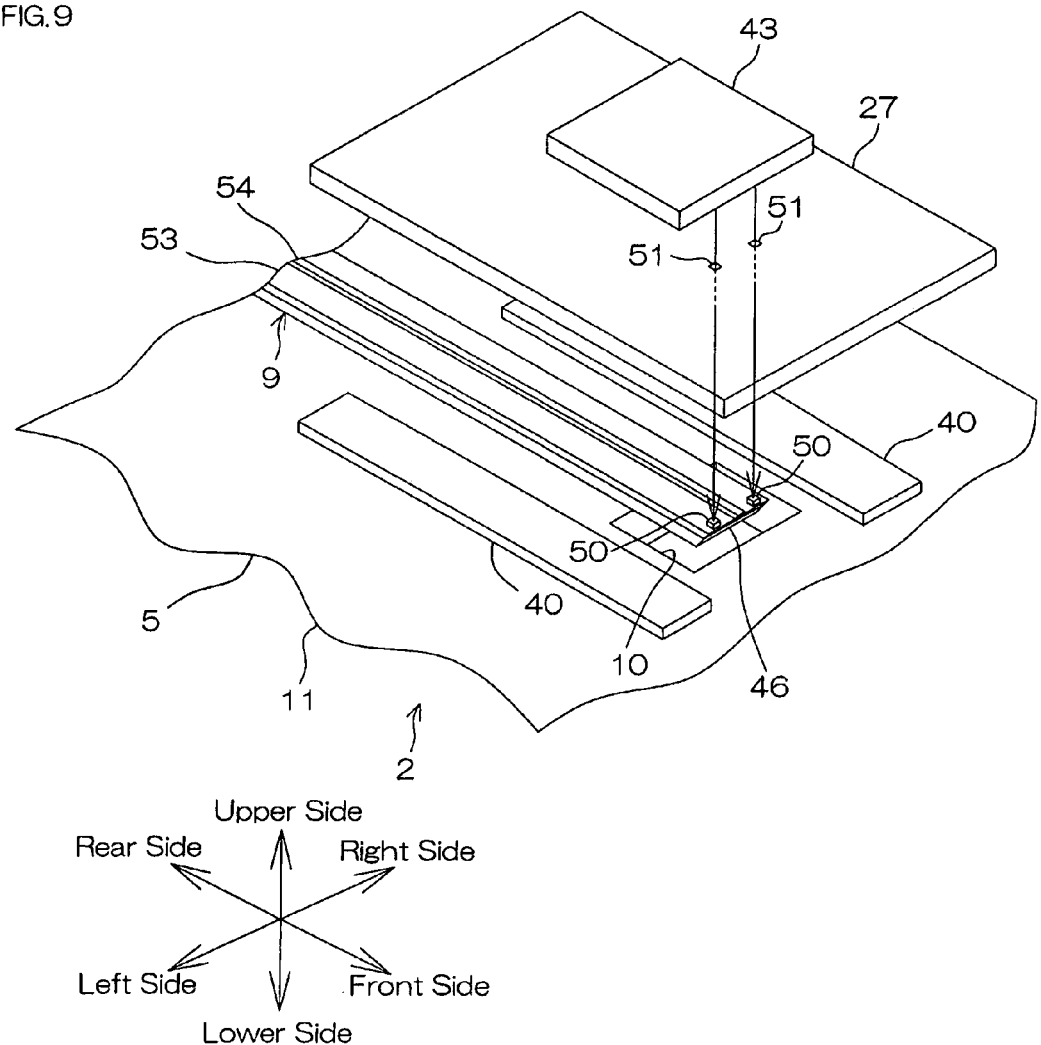
FIG. 9 is a perspective view illustrating positioning of a head slider with respect to the secondary optical waveguide.
Figure 10:
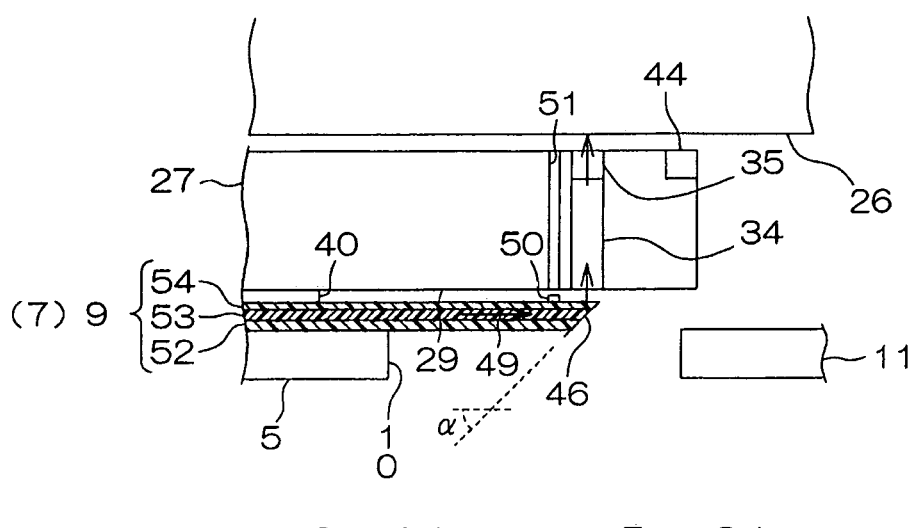
FIG. 10 is a sectional view of the suspension board with circuit in which the head slider has been positioned.

FIG. 1 is a plan view illustrating a suspension board with circuit of an embodiment according to the present invention; FIG. 2 is a sectional view, taken along an optical waveguide of the suspension board with circuit shown in FIG. 1; FIG. 3 is an enlarged sectional view of the front end portion of the suspension board with circuit shown in FIG. 1; FIG. 4 is an enlarged plan view illustrating the connecting condition of a first optical waveguide and a secondary optical waveguide in the suspension board with circuit shown in FIG. 3; FIG. 5 is an enlarged perspective view illustrating the connecting condition shown in FIG. 4; FIG. 6 is an enlarged perspective view of the front end portion of the secondary optical waveguide in the suspension board with circuit shown in FIG. 3; FIG. 7 is a sectional view illustrating the method of producing the suspension board with circuit, and the left side view is a sectional view, taken along the line A-A in FIG. 3 and the right side view is a sectional view, taken along the line B-B in FIG. 3; FIG. 8 is a sectional view illustrating the step of forming the first over clad layer and the secondary over clad layer shown in FIG. 7(d), and the left side view is a sectional view, taken along the line A-A in FIG. 3 and the right side view is a sectional view, taken along the line B-B in FIG. 3; FIG. 9 is a perspective view illustrating positioning of a head slider with respect to the secondary optical waveguide; and FIG. 10 is a sectional view of the suspension board with circuit in which the head slider has been positioned.

To clarify a relative position of a conductive layer 13 and an optical waveguide 7, which are mentioned later, an insulating base layer 12 and an insulating cover layer 14, which are mentioned later, are omitted in FIGS. 1 and 3.

In FIG. 1, the suspension board with circuit 1 includes a circuit board 2 and an optical assist portion 3 provided on the circuit board 2.

The circuit board 2 includes a metal supporting board 11 mounted on a hard disk drive. The metal supporting board 11 supports the magnetic head 44 mounted thereon, while holding a minute gap between the magnetic head 44 and a hard disk 26 (cf. FIG. 10) against an airflow caused when the magnetic head 44 and the hard disk 26 travel relatively to each other. A conductive layer 13 for connecting a magnetic head 44 (cf. FIG. 10) and an external board (e.g., a read/write board, etc.; cf. dashed lines in FIG. 2) 25 is integrally formed on the metal supporting board 11.

The circuit board 2 is formed so as to correspond to the outer shape of the suspension board with circuit 1, and has a shape of a flat band extending in the lengthwise direction, integrally including a junction portion 4, a slider mounting portion 5 arranged on one side in the lengthwise direction (hereinafter referred to as the front side) of the junction portion 4, and an external mounting portion 6 arranged on the other side in the lengthwise direction (hereinafter referred to as the rear side) of the junction portion 4.

The junction portion 4 is arranged between the slider mounting portion 5 and the external mounting portion 6 in the front-to-rear direction, and is formed in a generally rectangular shape in plane view extending in the front-to-rear direction.

The slider mounting portion 5 is continuously formed from the front end of the junction portion 4 to extend ahead, while having a flat band shape expanding toward one side (the left side) in the widthwise direction (the direction perpendicular to the front-to-rear direction, the left-to-right direction) of the junction portion 4.

Specifically, as shown in FIGS. 1 and 3, each of the rear portion and front portion of the slider mounting portion 5 is formed in a generally rectangular shape in plane view, and the middle portion in the front-to-rear direction is formed in a taper shape in which the width of the slider mounting portion 5 gradually becomes narrower a s coming closer to the front side. More particularly, the right end edge of the slider mounting portion 5 extends in a linear shape from the front end of the junction portion 4 toward the front side in the rear portion, and bends toward obliquely left front side in the middle of the front-to-rear direction, and then bends toward the front side, and subsequently extends in a linear shape toward the front side in the front portion.

The slider mounting portion 5 includes a mounting portion 36 and a terminal forming portion 37.

The mounting portion 36, as a region (a dashed-line region in FIG. 3) for mounting a head slider 27 (cf. FIG. 10), is formed in a generally rectangular shape in plane view on the right side of the front portion of the slider mounting portion 5. Further, the mounting portion 36 includes a pedestal 40.

The pedestal 40 is provided for supporting the head slider 27 (cf. FIG. 10), and a plurality (two pieces) of the pedestals 40 are arranged with a space in the widthwise direction in which a secondary optical waveguide 9 to be described later can be provided. Each of the pedestals 40 is formed in a generally rectangular shape in plane view extending in the lengthwise direction.

Further, the mounting portion 36 is formed with an opening 10. The opening 10 is formed in a generally rectangular shape in plane view extending through the metal supporting board 11 in the thickness direction, and is formed at the widthwise center of the mounting portion 36.

The terminal forming portion 37 is a region in which a head-side terminal 17 to be described later is formed and having a generally rectangular shape in plane view extending along the widthwise direction, and is arranged in opposed relation on the front side of the mounting portion 36.

As shown in FIG. 1, the conductive layer 13 includes a head-side terminal 17, an external terminal 16 and a wire 15 for connecting the head-side terminal 17 and the external terminal 16, which are formed integrally and continuously.

A plurality of the wires 15 are provided along the front-to-rear direction of the circuit board 2, each wire 15 arranged in parallel at spaced intervals to each other in the widthwise direction.

Specifically, the wires 15 are arranged in the following manner. In the junction portion 4, the wires 15 extend in the front-to-rear direction. As shown in FIGS. 1 and 3, in the slider mounting portion 5, the wires 15 bend toward the left side, extend toward the left side along the rear end of the slider mounting portion 5, bend toward the front side, and then extend toward the front side along the left end edge thereof. Thereafter, in the front end of the slider mounting portion 5, the wires 15 turn back toward the rear side to finally reach the head-side terminals 17 in the terminal forming portion 37. Further, the rear end of the wires 15 are arranged to bend toward the right side to finally reach the external terminals 16 in the external mounting portion 6.

The head-side terminal 17 is formed in the terminal forming portion 37 of the slider mounting portion 5, and a plurality of the head-side terminals 17 are provided so as to each be connected with the front end portion of each of the wires 15. More specifically, the head-side terminals 17 are arranged at spaced intervals to each other in the widthwise direction. Terminals of the magnetic head 44 (cf. FIG. 10) are connected to the head-side terminals 17.

The external terminal 16 is arranged in the rear end portion of the external mounting portion 6, and a plurality of the external terminals 16 are provided so as to each be connected with the rear end portion of each of the wires 15. Further, the external terminals 16 are arranged at spaced intervals to each other in the front-to-rear direction. Terminals of the external board 25 (dashed lines in FIG. 2) are connected to the external terminals 16.

The external mounting portion 6 is continuously formed from the rear end of the junction portion 4 to extend backward, while having a flat band shape expanding toward the other side (the right side) in the widthwise direction of the junction portion 4.

As shown in FIG. 7(e), the circuit board 2 includes the metal supporting board 11, an insulating base layer 12 as an insulating layer formed on the metal supporting board 11, the conductive layer 13 as a conductive layer formed on the insulating base layer, and an insulating cover layer 14 formed on the insulating base layer 12 so as to cover the conductive layer 13.

As shown in FIGS. 1 to 3, the metal supporting board 11 is formed corresponding to the outer shape of the circuit board 2.

On the upper surface of the metal supporting board 11, the insulating base layer 12 is formed so as to correspond to a position in which the conductive layer 13 is formed in the junction portion 4, the slider mounting portion 5 and the external mounting portion 6. Further, on the upper surface of the metal supporting board 11, the insulating base layer 12 is arranged so as to exclude a region for forming an optical assist portion 3.

The conductive layer 13 is arranged over the junction portion 4, the slider mounting portion 5 and the external mounting portion 6 so as to be included in the insulating base layer 12 when projected in the thickness direction. Further, on the upper surface of the insulating base layer 12, the conductive layer 13 is formed as a wired circuit pattern including the external terminals 16, the head-side terminals 17, and the wires 15, which are formed integrally and continuously.

The insulating cover layer 14 is arranged over the junction portion 4, the slider mounting portion 5 and the external mounting portion 6, and on the upper surface of the insulating base layer 12, is arranged so as to correspond to a position the in which wires 15 are formed. The insulating cover layer 14 is formed so as to expose the external terminals 16 and the head-side terminals 17, and to cover the wires 15.

The optical assist portion 3 includes an optical waveguide 7 and a light emitting device 45.

The optical waveguide 7 is provided in the circuit board 2 and is arranged over the junction portion 4, the slider mounting portion 5 and the external mounting portion 6. As shown in FIG. 7(e), the optical waveguide 7 is arranged at spaced intervals on the right side of the wires 15. Specifically, the optical waveguide 7 is formed on the upper surface of the metal supporting board 11.

As shown in FIGS. 1 and 3, the optical waveguide 7 integrally includes a first optical waveguide 8 and a secondary optical waveguide 9.

The first optical waveguide 8 is arranged on the rear side of the optical waveguide 7, and includes a first curved portion 59, a first linear portion 57, a secondary curved portion 60, and a secondary linear portion 66.

In FIG. 1, the first curved portion 59 is formed so as to curve toward obliquely left front side from the light emitting device 45. More particularly, the first curved portion 59 is formed as a part of a circular arc whose center C1 is located on the right side of the optical waveguide 7.

The first linear portion 57 is formed so as to extend in a linear shape from the front end of the first curved portion 59 toward the front side in the junction portion 4.

The secondary curved portion 60 is formed so as to curve toward obliquely left front side from the front end of the first linear portion 57 in the slider mounting portion 5. While a rear portion 62 thereof is formed as a part of a circular arc whose center C3 is located on the left side of the optical waveguide 7, a front portion 61 thereof is formed as a part of a circular arc whose center C2 is located on the right side of the optical waveguide 7.

The secondary linear portion 66 is formed so as to extend in a linear shape from the front end of the secondary curved portion 60 toward the front side in the slider mounting portion 5.

The secondary optical waveguide 9 is continuously arranged on the front side of the first optical waveguide 8, and includes a third linear portion 58.

The third linear portion 58 is formed in a linear shape from the front end of the secondary linear portion 66 of the first optical waveguide 8 toward the front side in the slider mounting portion 5.

The radius of curvature R1 of the first curved portion 59, the radius of curvature R3 of the rear portion 62 of the secondary curved portion 60, and the radius of curvature R2 of the front portion 61 of the secondary curved portion 60 are in the range of, for example, 100 mm or less, or preferably 50 mm or less, or more preferably 15 mm or less, and usually, for example, 5 mm or more, or preferably 10 mm or more.

In the case where the radius of curvature described above exceeds the above-mentioned range, the degree of freedom of arrangement of the optical waveguide 7 may decrease. Further, in the case where the radius of curvature R1 is below the above-mentioned range, a loss of light may not be able to be reduced.

The optical waveguide 7 is arranged so as to let a front end face 46 of the third linear portion 58 face the opening 10.

As shown in FIGS. 5 and 7(*e*), the first optical waveguide 8 is composed as an embedded optical waveguide in which a core layer (a first core layer 23) is embedded in a clad layer (a first under clad layer 22 and a first over clad layer 24).

Specifically, as shown in FIG. 5 and the left figure of FIG. 7(*e*), the first optical waveguide 8 includes the first under clad layer 22, and the first core layer 23 formed on the first under clad layer 22 so as to be included in the first under clad layer 22 when projected in the thickness direction of the first under clad layer 22, and the first over clad layer 24 formed on the first under clad layer 22 so as to cover the first core layer 23.

On the upper surface of the metal supporting board 11, the first under clad layer 22 is formed in a flat band shape extending in the lengthwise direction so as to correspond to the outer shape of the first optical waveguide 8.

On the upper surface of the first under clad layer 22, the first core layer 23 is arranged at the widthwise center of the first under clad layer 22 and is formed so as to expose both widthwise end portions of the first under clad layer 22.

The first over clad layer 24 is formed on the surface (the upper surface and both side surfaces) of the first core layer 23 and on the upper surface of the first under clad layer 22 exposed from the first core layer 23.

On the other hand, the secondary optical waveguide 9 is composed as a loaded optical waveguide in which an over clad layer (a secondary over clad layer 54) is laminated (loaded) on a core layer (a secondary core layer 53) with its width narrower than the width of the core layer (the secondary core layer 53). Specifically, the secondary optical waveguide 9 includes a secondary under clad layer 52, and the secondary core layer 53 formed on the secondary under clad layer 52, and the secondary over clad layer 54 formed on the secondary core layer 53 so as to be included in the secondary core layer 53 when projected in the thickness direction of the secondary core layer 53.

The secondary under clad layer 52 is formed as the same layer as the above-mentioned first under clad layer 22, that is, on the upper surface of the metal supporting board 11, is formed so as to correspond to the outer shape of the secondary optical waveguide 9, and is formed in a flat band shape extending along the lengthwise direction. Further, the secondary under clad layer 52 is formed to have the same width as the first under clad layer 22.

The secondary core layer 53 is formed as the same layer as the above-mentioned first core layer 23, that is, is formed over the entire upper surface of the first under clad layer 52 so that both widthwise end edges of the secondary core layer 53 are in the same positions in plane view as those of the secondary under clad layer 52. The secondary core layer 53 is formed to have the same width as the first under clad layer 22.

The secondary over clad layer 54 is formed as the same layer as the above-mentioned first over clad layer 24, that is, extends along the lengthwise direction and on the upper surface of the secondary core layer 53, is formed so as to have a narrower width than that of the secondary core layer 53. More specifically, the secondary over clad layer 54 is arranged at the widthwise center of the secondary core layer 53 and is formed so as to expose both widthwise end portions of the secondary core layer 53. The secondary over clad layer 54 (except for a rear end portion 56) is formed to have the same width as the first core layer 23 (except for a front end portion 55).

As shown in FIGS. 3 to 5, the first optical waveguide 8 and the secondary optical waveguide 9 are optically connected in the lengthwise direction.

That is, the first optical waveguide 8 and the secondary optical waveguide 9 are arranged next to each other in the lengthwise direction, and specifically, the front end of the first optical waveguide 8 and the rear end of the secondary optical waveguide 9 are continuously formed.

In the first optical waveguide 8 and the secondary optical waveguide 9, the axis of the first core layer 23 is formed so as to conform to that of the secondary over clad layer 54 in plane view.

The front end edges of the first under clad layer 22 and the first over clad layer 24, and the rear end edges of the secondary under clad layer 52 and the secondary core layer 53 are formed to have the same width to each other.

Further, the front end portion (the end portion at the secondary optical waveguide side) 55 of the secondary linear portion 66 in the first core layer 23 is formed so that the width (length in widthwise direction) thereof becomes narrower as coming closer to the secondary optical waveguide 9 when projected in the thickness direction. That is, the front end portion 55 of the first core layer 23 is formed in a generally trapezoidal shape (a generally funnel shape, taper shape) in plane view in which the width gradually becomes narrower as coming closer to the front side.

Furthermore, the rear end portion (the end portion at the first optical waveguide side) 56 of the third linear portion 58 in the secondary over clad layer 54 is formed so that the width (length in widthwise direction) thereof becomes larger as coming closer to the first optical waveguide 8 when projected in the thickness direction. That is, the rear end portion 56 of the secondary over clad layer 54 is formed in a generally trapezoidal shape (a generally funnel shape) in which the width gradually becomes narrower as coming closer to the front side.

In the first optical waveguide 8, when light is applied to the first core layer 23, a first path 48 transmitting the light along the first core layer 23 is formed.

On the other hand, in the secondary optical waveguide 9, in the secondary core layer 53, when light is applied to the portion facing the underside of the secondary over clad layer 54, a secondary path 49 transmitting the light along the secondary over clad layer 54 is formed.

As shown in FIGS. 6 and 9, the secondary optical waveguide 9 is formed in a shape in which the front end portion thereof is beveled, specifically, as shown in FIG. 10, in which the front end face 46 thereof intersects the lengthwise direction of the secondary optical waveguide 9 at a given angle (tilt angle) α, for example. This forms the secondary optical waveguide 9 so that the front end face 46 thereof is a mirror surface having a tilt angle α. The light transmitted through the secondary path 49 of the secondary optical waveguide 9 has its optical path deflected at a given angle by the front end face 46, and the light thus deflected is applied upward, specifically, toward an entrance of the slider-side optical waveguide 34 to be described later. Such tilt angle α is in the range of, for example, 35 to 55° C., or preferably 40 to 50° C., or more specifically 45° C.

As shown in FIGS. 1 and 7, a portion which faces the opening 10 (a portion including the end face 46) of the secondary optical waveguide 9 is exposed from the opening 10 of the metal supporting board 11.

Further, a positioning mark 50 as a positioning portion is provided on the secondary optical waveguide 9.

As shown in FIGS. 3, 6, and the right figure of FIG. 7(*e*), the positioning mark 50 is a reference mark for positioning the front end face 46 of the secondary optical waveguide 9 and the entrance of the slider-side optical waveguide (the secondary optical waveguide) 34, and a plurality (two pieces) of the positioning marks 50 are provided on both widthwise outer sides of the secondary over clad layer 54 in the front end portion of the secondary optical waveguide 9.

Each of the positioning marks 50 is formed as the same layer as the above-mentioned secondary over clad layer 54, that is, is formed on the upper surface of the secondary core layer 53. The positioning marks 50 are formed each in a generally rectangular shape in plane view and are arranged in spaced relation on both widthwise outer sides of the secondary over clad layer 54.

As shown in FIGS. 1 and 2, the light emitting device 45 is a light source for allowing light to be applied to the optical waveguide 7, and for example, converts electric energy into light energy to thereby apply high-energy light to the optical waveguide 7. The light emitting device 45 is arranged on the external mounting portion 6, and more specifically, is arranged in spaced intervals on the front side of the external terminals 16 in the right side end portion of the external mounting portion 6. The light emitting device 45 is connected with the rear end portion of the first optical waveguide 8 so as to enter light into the first path 48 of the first core layer 23 of the first optical waveguide 8.

The light emitting device 45 is connected with the external board 25 via a supplying wire (not shown) so as to supply electric energy.

In the optical assist portion 3, the electric energy supplied through a supplying wire from the external board 25 is converted into light energy in the light emitting device 45, and the resulting light is applied to the first optical waveguide 8. The applied light is transmitted through the secondary optical waveguide 9 and is reflected by the front end face 46 of the secondary optical waveguide 9, to be finally applied to the slider-side optical waveguide 34 (cf. FIG. 10) of the head slider 27.

Next, a method for producing the suspension board with circuit 1 is described with reference to FIGS. 7 and 8.

First, in this method, as shown in FIG. 7(*a*), a circuit board 2 in which an insulating base layer 12, a conductive layer 13, and an insulating cover layer 14 are sequentially laminated on a metal supporting board 11 is prepared.

In order to prepare the circuit board 2, the metal supporting board 11 is first prepared.

The metal supporting board 11 is formed from metal material, such as stainless steel, 42-alloy, aluminum, copper-beryllium, or phosphor bronze. The metal supporting board 11 has a thickness in the range of, for example, 15 to 30 µm, or preferably 20 to 25 µm.

Then, the insulating base layer 12 is formed on the metal supporting board 11.

As an insulating material for forming the insulating base layer 12, for example, synthetic resin such as polyimide resin, polyamide imide resin, acrylic resin, polyether nitrile resin, polyether sulfone resin, polyethylene terephthalate resin, polyethylene naphthalate resin, and polyvinyl chloride resin is used. Of these, polyimide resin is preferably used.

To form the insulating base layer 12, for example, a varnish of the insulating material described above having photosensitivity is applied to the upper surface of the metal supporting board 11 and is then dried. Thereafter, the dried varnish is exposed to light via a photomask, and is then developed to be cured as required.

The insulating base layer 12 thus formed has a thickness in the range of, for example, 1 to 35 µm, or preferably 8 to 15 µm.

Subsequently, the conductive layer 13 is formed on the insulating base layer 12.

As a conductive material for forming the conductive layer 13, for example, copper, nickel, gold, solder, or alloys thereof is used.

To form the conductive layer 13, a known patterning method such as an additive method or a subtractive method is used.

The conductive layer 13 thus formed has a thickness in the range of, for example, 3 to 50 µm, or preferably 5 to 20 µm. Each of wires 15 has a width in the range of, for example, 10 to 200 µm, or preferably 20 to 100 µm, and a spacing between each of the wires 15 is in the range of, for example, 10 to 1000 µm, or preferably 20 to 100 µm. External terminals 16 and head-side terminals 17 each have a width in the range of, for example, 20 to 1000 µm, or preferably 30 to 800 µm, and a spacing between each of the external terminals 16 and a spacing between each of the head-side terminals 17 are in the range of, for example, 20 to 1000 µm, or preferably 30 to 800 µm.

The insulating cover layer 14 is formed from the same insulating material as that for the above-mentioned insulating base layer 12.

To form the insulating cover layer 14, for example, a varnish of the insulating material described above having photosensitivity is applied to the upper surface of the metal supporting board 11 including the conductive layer 13 and the insulating base layer 12, and is then dried. Thereafter, the dried varnish is exposed to light via a photomask, and is then developed to be cured as required.

The insulating cover layer 14 thus formed has a thickness in the range of, for example, 1 to 40 µm, or preferably 1 to 7 µm.

Therefore, the circuit board 2 in which the insulating base layer 12, the conductive layer 13, and the insulating cover layer 14 are sequentially laminated on the metal supporting board 11 is prepared.

Simultaneously with the formation of the above-mentioned insulating base layer 12, conductive layer 13 and/or insulating cover layer 14, a pedestal 40 is formed from the same material as those.

Next, in this method, as shown in FIGS. 7(*b*) to 7(*e*), an optical waveguide 7 is provided in the circuit board 2.

Specifically, a first under clad layer 22 and a secondary under clad layer 52, a first core layer 23 and a secondary core layer 53, and a first over clad layer 24 and a secondary over clad layer 54 are sequentially laminated on the metal supporting board 11.

That is, as shown in FIG. 7(*b*), the first under clad layer 22 and the secondary under clad layer 52 are simultaneously formed on the upper surface of the metal supporting board 11.

As a material for forming the first under clad layer 22 and the secondary under clad layer 52, for example, a flexible material, specifically a resin material such as polyimide resin, polyamide resin, silicone resin, epoxy resin (alicyclic epoxy resin, etc.), acrylic resin, fluorene derivative resin, a mixed resin of fluorene derivative resin and alicyclic epoxy resin, and a mixed resin of any of these resins and an alicyclic ether compound (e.g., an oxetane compound, etc.) is used. Of these, polyimide resin is preferably used in terms of heat resistance, epoxy resin is preferably used in terms of resolution, and acrylic resin is preferably used in terms of alkaline development. Preferably, these resin materials are used in the form of photosensitive resins containing a photosensitizer. Preferably, a mixed resin of a photosensitive fluorene derivative resin (a photosensitive fluorene epoxy resin as raw material) and an alicyclic epoxy resin is used. As the photosensitizer, for example, a known onium salt or the like is used.

To form the first under clad layer 22 and the secondary under clad layer 52 in the above-mentioned pattern, for example, a varnish (resin solution) of any of the above-mentioned photosensitive resins is prepared using a known diluent, and the varnish thus prepared is applied to the entire upper surface of the metal supporting board 11 including the insulating cover layer 14 and the insulating base layer 12. Then, the applied varnish is dried to form a photosensitive coating. Thereafter, the coating is exposed to light via a photomask and is then developed by dissolving an unexposed portion with a known organic solvent or the like. Thereafter, the developed varnish is cured as required.

The first under clad layer 22 and the secondary under clad layer 52 thus formed have the same refractive index in the range of, for example, 1.600 or more and less than 1.615. The first under clad layer 22 and the secondary under clad layer 52 have a thickness in the range of, for example, 1 to 25 µm, or preferably 1 to 5 µm, and a width in the range of, for example, 20 to 200 µm, or preferably 30 to 100 µm.

Subsequently, as shown in FIG. 7(*c*), the first core layer 23 and the secondary core layer 53 are formed on the upper surface of the first under clad layer 22 and the secondary under clad layer 52, respectively.

As a material for forming the first core layer 23 and the secondary core layer 53, a resin material having a higher refractive index than that of the first under clad layer 22 and the secondary under clad layer 52 is used. The resin material that may be used includes, for example, the same resin as those mentioned above. Preferably, a mixed resin of a photosensitive fluorene derivative resin (a photosensitive fluorene epoxy resin as raw material) and an oxetane compound is used. In the resin material of the first core layer 23 and the secondary core layer 53, in order to make the refractive index of the first core layer 23 and the secondary core layer 53 higher than that of the first under clad layer 22 and the secondary under clad layer 52, an aromatic group such as a phenyl group can be introduced or a linear aliphatic group such as a methyl group and an ethyl group, and/or a cyclic aliphatic group such as a norbornene group can also be introduced.

To form the first core layer 23 and the secondary core layer 53 in the above-mentioned pattern, for example, a varnish (resin solution) of any of the above-mentioned photosensitive resins is prepared using a known diluent, and the varnish thus prepared is applied to the upper surface of the metal supporting board 11 including the first under clad layer 22 and the secondary under clad layer 52. Thereafter, the applied varnish is dried to form a photosensitive coating. Thereafter, the coating is exposed to light via a photomask, and is then developed by dissolving an unexposed portion with a known organic solvent or the like. Thereafter, the developed varnish is cured as required.

The refractive index of the first core layer 23 and the secondary core layer 53 thus formed is the same, and is set higher than that of the first under clad layer 22 and the secondary under clad layer 52, and specifically, the refractive index of the first core layer 23 and the secondary core layer 53 is set, for example, 0.001 to 0.2 higher than that of the under clad layer 22 from the viewpoint of configuring the first path 48 of the first core layer 23 and the secondary path 49 of the secondary core layer 53 in a single mode distribution. The first core layer 23 and the secondary core layer 53 have a refractive index in the range of, for example, more than 1.600 and 1.65 or less. The first core layer 23 and the secondary core layer 53 have a thickness in the range of, for example, 1 to 20 µm, or preferably 1 to 10 µm.

In the first core layer 23, the width W1 of the front end edge (the front end edge of the secondary linear portion 66, the end edge of the secondary optical waveguide 9 side) thereof is in the range of, for example, 10 µm or less, or preferably 5 µm or less, and usually 1 µm or more, or preferably 2 µm or more, and the width W2 other than the front end edge of the first core layer 23 (the first curved portion 59, the first linear portion 57, the secondary curved portion 60, and the rear end edge and the middle of the front-to-rear direction of the secondary linear portion 66) is in the range of, for example, 20 µm or less, or preferably 10 µm or less, and usually 2 µm or more, or preferably 4 µm or more.

When the width W2 other than the front end edge of the first core layer 23 is within the above-mentioned range, the first path 48 can be configured in a single mode distribution.

When the width W1 of the front end edge of the first core layer 23 is within the above-mentioned range, a light can be transmitted with high intensity from the first core layer 23 to the secondary core layer 53.

The width of the secondary core layer 53, is the same as that of the secondary under clad layer 52.

Next, as shown in FIG. 7(*d*), the first over clad layer 24 and the secondary over clad layer 54 are formed on the upper surface of the first under clad layer 22 and the secondary core layer 53, respectively. At the same time as this, the positioning marks 50 are formed on the upper surface of the secondary core layer 53 in the above-mentioned pattern.

As a material for forming the first over clad layer 24, the secondary over clad layer 54, and the positioning marks 50, the same resin material as that for the first under clad layer 22 and the secondary under clad layer 52 described above is used.

To form the first over clad layer 24, the secondary over clad layer 54, and the positioning marks 50 in the above-mentioned pattern, first, for example, as shown in FIG. 8(a), a varnish (resin solution) of any of the above-mentioned resins is prepared using a known diluent, and the varnish thus prepared is applied to the upper surface of the metal supporting board 11 including the first core layer 23, the first under clad layer 22, and the secondary core layer 53. Thereafter, the applied varnish is dried to form a photosensitive coating 39 on the first core layer 23 and the secondary core layer 53, on the insulating cover layer 14, and the metal supporting board 11 exposed from the first core layer 23 and the secondary core layer 53, and the insulating cover layer 14.

Then, as shown in FIG. 8(b), the coating 39 is exposed to light via a photomask 38.

The photomask 38 is provided with a mask pattern having a light-shielded portion 41 and a light-transmitted portion 42. The photomask 38 is then arranged above the coating 39, the light-transmitted portion 42 is opposed to a portion in which the first over clad layer 24, the secondary over clad layer 54, and the positioning marks 50 are formed, and the light-shielded portion 41 is opposed to the other portion. Subsequently, the coating 39 is exposed to light from above via the photomask 38.

Thereafter, as shown in FIG. 8(c), the portion opposed to the light-shielded portion 41, that is, an unexposed portion is dissolved using a known organic solvent or an alkaline aqueous solution or the like to thereby develop the coating 39, and thereafter the resulting coating 39 is cured as required.

Thus, the first over clad layer 24, the secondary over clad layer 54, and the positioning marks 50 are simultaneously formed in the above-mentioned pattern.

The refractive index of the first over clad layer 24, the secondary over clad layer 54, and the positioning marks 50 thus formed is the same to each other, and is set lower than that of the first core layer 23 and the secondary core layer 53, and is set to, for example, the same refractive index as that of the first under clad layer 22 and the secondary under clad layer 52.

The first over clad layer 24, the secondary over clad layer 54, and the positioning marks 50 each have a thickness in the range of, for example, 1 to 20 µm, or preferably, 1 to 10 µm.

As shown in FIG. 4, in the secondary over clad layer 54, the width W3 of the rear end edge (the rear end edge of the third linear portion 58, the end edge of the first optical waveguide 8 side) thereof is in the range of, for example, 25 µm or more, or preferably 30 µm or more, and usually 70 µm or less, or preferably 50 µm or less, and the width W4 other than the rear end edge (the middle of the front-to-rear direction and the front end edge of the third linear portion 58) thereof is substantially the same as the width W2 other than the front end edge of the above-mentioned first core layer 23.

When the width W4 other than the rear end edge of the secondary over clad layer 24 is within the above-mentioned range, the secondary path 49 can be configured in a single mode distribution.

When the width W3 of the rear end edge of the secondary over clad layer 24 is within the above-mentioned range, a light can be transmitted efficiently from the first optical waveguide 8 to the secondary optical waveguide 9.

The positioning mark 50 has a width and a length (length in lengthwise direction) in the range of, for example, 10 to 100 µm, or preferably 20 to 40 µm.

Thus, the optical waveguide 7 provided with the positioning marks 50 is provided on the metal supporting board 11.

Next, in this method, as shown in FIG. 7(e), an opening 10 is formed in the metal supporting board 11 in a terminal forming portion 37.

The opening 10 is formed by, for example, boring such as drilling, or for example, etching such as dry etching and wet etching, or preferably by etching.

The opening 10 is formed so as to overlap with the front end portion of the secondary optical waveguide 9 in the thickness direction.

The opening 10 thus formed has a width and a length in the range of, for example, 50 to 500 µm, or preferably 100 to 200 µm.

Subsequently, in this method, as shown in FIG. 10, the front end portion of the secondary optical waveguide 9 is cut from the opening 10 side by laser processing in such a beveled manner that a front end face 46 of the secondary optical waveguide 9 intersects the lengthwise direction.

In the laser processing, a laser light which passes through the opening 10 is applied to the secondary optical waveguide 9 from obliquely rear lower side so as to intersect the lengthwise direction at a given angle, to thereby cut the secondary optical waveguide 9 at once.

Thereafter, on the external mounting portion 6, as shown in phantom lines in FIG. 2, a light emitting device 45 is disposed on the upper surface of the metal supporting board 11 so as to be optically connected with the rear end of the first optical waveguide 8 and be electrically connected with the external board 25 via a supplying wire (not shown). Thus, the suspension board with circuit 1 is obtained.

A magnetic head 44 (FIG. 10) and an IC 32 for controlling the light emitting device 45 are mounted on the external board 25, and the IC 32 is electrically connected with the external terminals 16.

Next, a method for positioning a head slider 27 relative to the optical waveguide 7 of the suspension board with circuit 1 using the positioning marks 50 is described with reference to FIGS. 9 and 10.

In FIG. 9, the head slider 27 is arranged above the secondary optical waveguide 9 and the pedestal 40 in spaced relation thereto, and a camera 43 is also arranged above the front end portion of the secondary optical waveguide 9 so as to sandwich the head slider 27.

As shown in FIG. 10, the head slider 27 integrally includes a slider body 29, and a slider-side optical waveguide 34, a near-field light generation portion 35 and a magnetic head 44 which are provided in the front end portion thereof.

The slider-side optical waveguide 34 is provided in order to enter light applied from the front end face 46 of the secondary path 49 of the secondary optical waveguide 9 into the near-field light generation portion 35. The slider-side optical waveguide 34 is formed along the thickness direction of the suspension board with circuit 1, its lower end (an entrance) being opposed in spaced relation to the front end face 46 of the secondary path 49 of the secondary optical waveguide 9 in the thickness direction, and its upper end (an exit) being connected with the near-field light generation portion 35 to be described below.

The near-field light generation portion 35 is provided in order to produce a near-field light from the light (transmission light) emitted from the upper end of the slider-side optical waveguide 34, and apply the near-field light to the surface of the hard disk 26 to heat a minute region on the surface of the hard disk 26. The near-field light generation portion 35 is provided in the slider body 29 so as to be fixed to the upper end of the slider-side optical waveguide 34. Such near-field light generation portion 35 is made of a metal scatterer, an opening, etc. and known near-field light generators described in, for example, Japanese Unexamined Patent Publications No. 2007-280572, No. 2007-052918, No. 2007-207349, No. 2008-130106 or the like are used.

The magnetic head 44 is mounted near the near-field light generation portion 35 in order to record information in a minute region on the surface of the hard disk 26 heated by the near-field light generation portion 35.

A plurality (two pieces) of slider marks 51 arranged in spaced relation to each other in the widthwise direction are provided in the front end portion of the slider body 29 so as to correspond to the positioning marks 50.

Each of the slider marks 51 is formed in the form of an opening extending through the slider body 29 in the thickness direction, and is serving as a reference for positioning of the head slider 27 and the optical waveguide 7. More particularly, when the slider marks 51 and the positioning marks 50 are aligned, the near-field light generation portion 35 and the slider-side optical waveguide 34 of the head slider 27 are opposed to the front end face 46 of the secondary path 49 in the front end portion of the secondary optical waveguide 9 in the thickness direction.

In this method, in the above-mentioned arrangement, the slider marks 51 and the positioning marks 50 are aligned using the camera 43. That is, the head slider 27 is positioned relative to the secondary optical waveguide 9 so that the positioning marks 50 are visually identified through the slider marks 51 from the camera 43.

After the positioning, the head slider 27 is fixed to the upper surface of the pedestal 40 of the suspension board with circuit 1 through adhesives, etc. as required.

Thereafter, the terminals of the magnetic head 44 are electrically connected with the head-side terminals 17.

The hard disk drive mounted with the suspension board with circuit 1 mounted with the head slider 27 adopts an optical assist system.

In the hard disk drive, as shown in FIG. 10, for example, the hard disk 26 travels relatively to the near-field light generation portion 35 and to the magnetic head 44.

A light emitted from the light emitting device 45 enters into the rear end portion of the first path 48 of the first optical waveguide 8, the light is then transmitted toward the front side in the first path 48, subsequently the light is transmitted to the secondary path 49 of the secondary optical waveguide 9, its optical path is deflected upward on the front end face 46 of the secondary path 49, and the light is finally emitted upward from the front end face 46 of the secondary path 49. Thereafter, the light emitted from the secondary path 49 enters into the lower end portion of the slider-side optical waveguide 34 and then transmitted upward in the slider-side optical waveguide 34. The light thus transmitted is emitted from the upper end portion of the slider-side optical waveguide 34 and then enters into the near-field light generation portion 35. Thereafter, the application of the light produces a near-field light in the near-field light generation portion 35, and the near-field light is applied toward the surface of the hard disk 26.

The application of the near-field light from the near-field light generation portion 35 causes the surface of the hard disk 26 to be heated. In such state, a magnetic field is applied from the magnetic head 44, whereby information is recorded on the surface of the hard disk 26. More particularly, the heating caused by the application of the near-field light from the near-field light generation portion 35 reduces a coercive force of the surface of the hard disk 26, and information is recorded on such surface of the hard disk 26 at high density by applying a small magnetic field from the magnetic head 44.

In the suspension board with circuit 1, the first core layer 23 is included in the first under clad layer 22 and is covered with the first over clad layer 24. That is, the first optical waveguide 8 including the first curved portion 59 and the secondary curved portion 60 is made of an embedded optical waveguide, so that a loss of light in the first core layer 23 can be reduced.

In the secondary optical waveguide 9 including the third linear portion 58, the secondary over clad layer 54 is formed on the secondary core layer 53 and is included in the secondary core layer 53 when projected in the thickness direction of the secondary core layer 53. That is, the secondary optical waveguide 9 including the third linear portion 58 is made of a loaded optical waveguide, so that a light can be transmitted with high intensity, whereas a loss of light in the secondary core layer 53 can be reduced.

Thus, while allowing to be arranged corresponding to the shape of the circuit board 2, information can be recorded on the hard disk 26 at high density, thereby allowing to efficiently perform the optical assist system.

According to the suspension board with circuit 1, the use of the positioning marks 50 enables the near-field light generation portion 35 and the slider-side optical waveguide 34 to be accurately positioned relative to the secondary optical waveguide 9. This allows a light transmitted through the secondary optical waveguide 9 to be reliably applied to the near-field light generation portion 35 through the slider-side optical waveguide 34, so that the hard disk 26 can sufficiently be heated.

As a result, the information can be recorded on the hard disk 26 at high density, thereby allowing to even further reliably perform the optical assist system.

Further, in the above-mentioned optical waveguide 7, since the first core layer 23 and the secondary over clad layer 54 are formed in a specified width range, the light transmitted through the first optical waveguide 8 and the secondary optical waveguide 9 is reliably and efficiently applied as a single-mode light to the near-field light generation portion 35, allowing the hard disk 26 to be heated reliably and efficiently.

Figure 11:
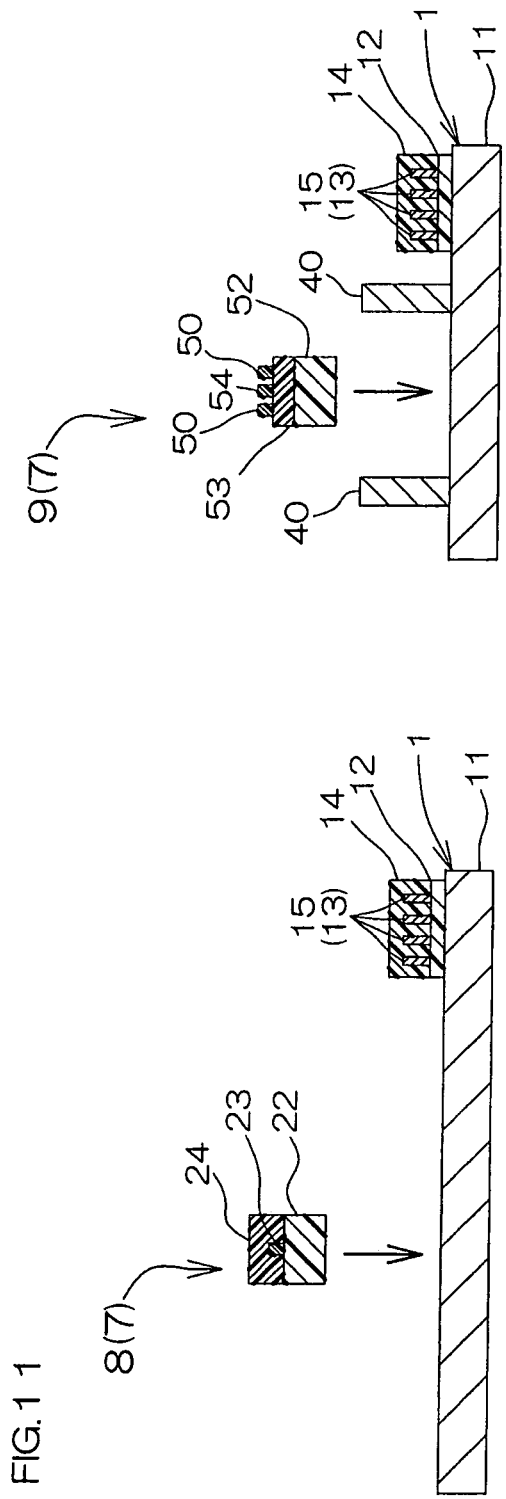
FIG. 11 is a sectional view illustrating the method of producing a suspension board with circuit of another embodiment according to the present invention, and the left side view is a sectional view, taken along the line A-A in FIG. 1 and the right side view is a sectional view taken along the line B-B in FIG. 1, illustrating the step of placing the first optical waveguide and the secondary optical waveguide on the suspension board with circuit.
Figure 12:
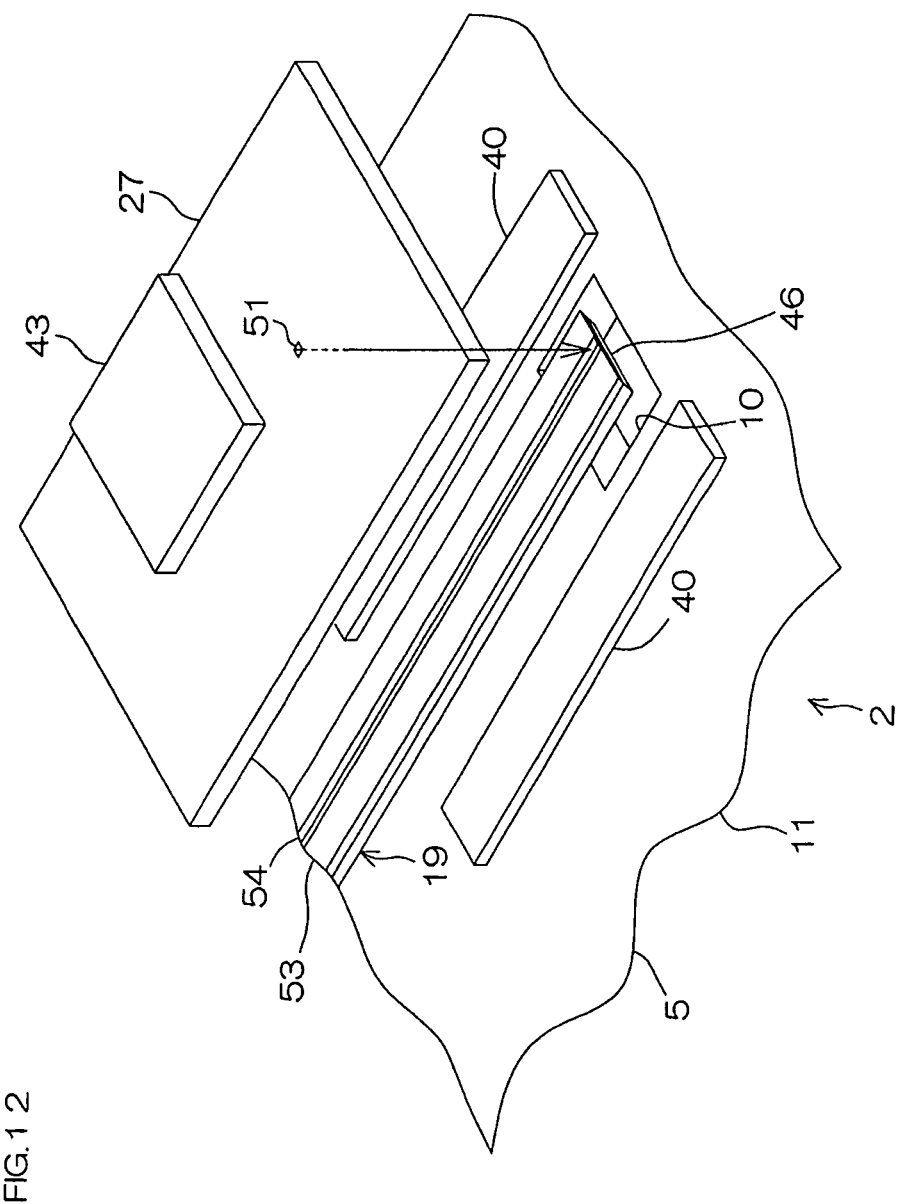
FIG. 12 is a perspective view illustrating positioning of the head slider with respect to the secondary optical waveguide (an embodiment in which a positioning mark is not formed)
Figure 13:
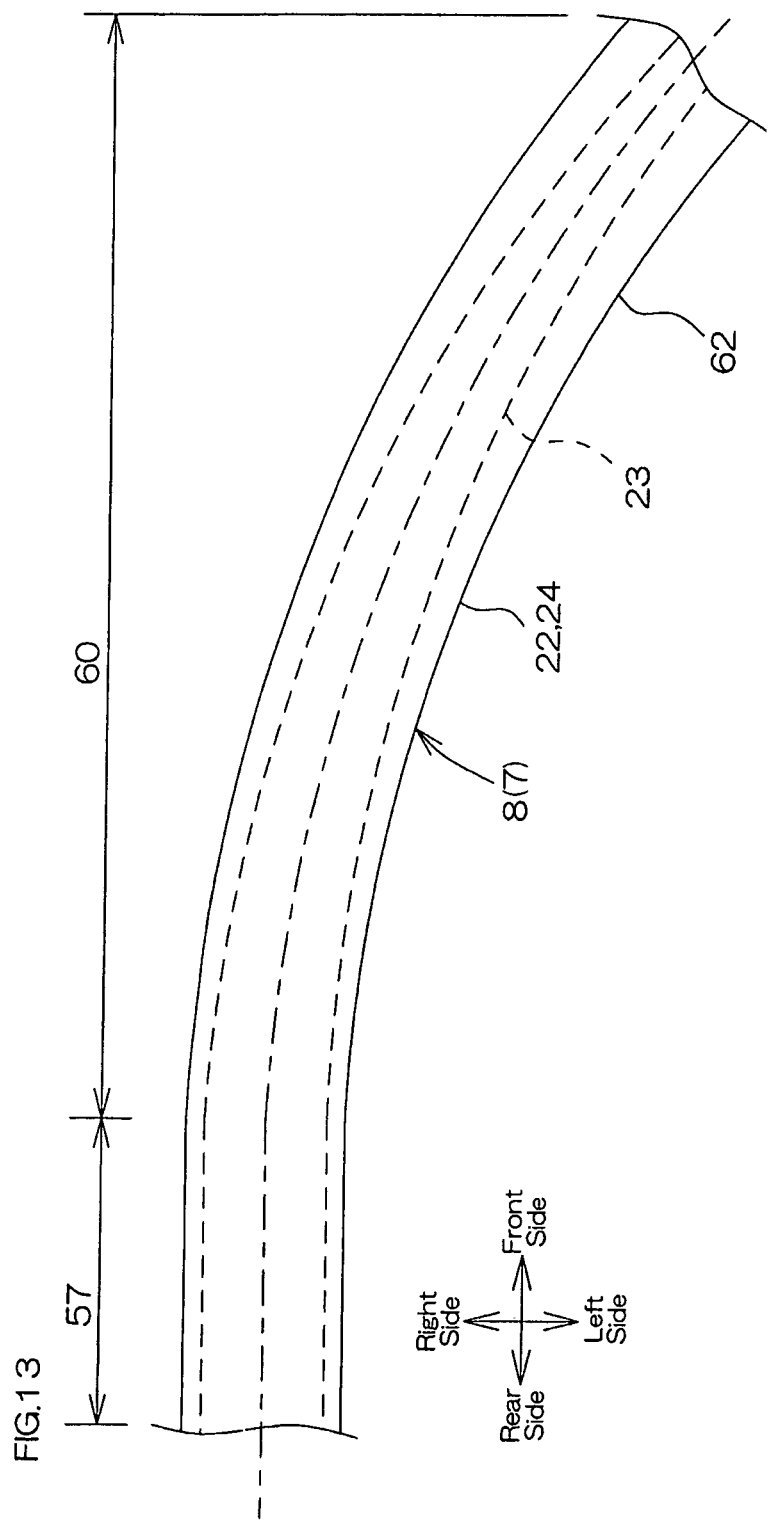
FIG. 13 is an enlarged plan view illustrating the first optical waveguide (an embodiment in which the width of the first core layer in a secondary curved portion and a secondary linear portion is gradually reduced toward the front side) of the suspension board with circuit of another embodiment according to the present invention, illustrating the rear portion of the secondary curved portion.
Figure 14:
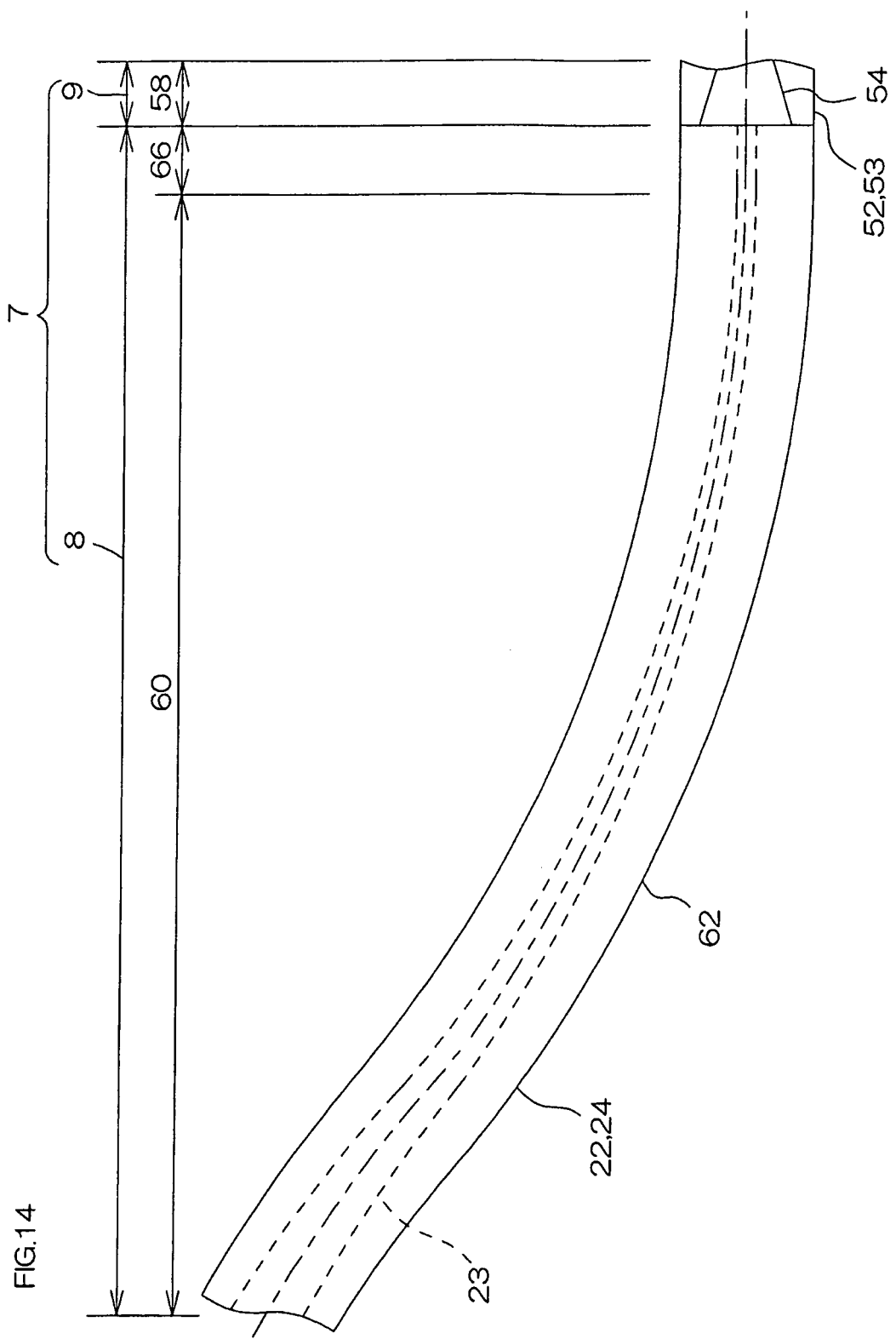
FIG. 14 is an enlarged plan view illustrating the first optical waveguide (an embodiment in which the width of the first core layer in the secondary curved portion and the secondary linear portion is gradually reduced toward the front side) of the suspension board with circuit of another embodiment according to the present invention, illustrating the front portion of the secondary curved portion.
Figure 15:
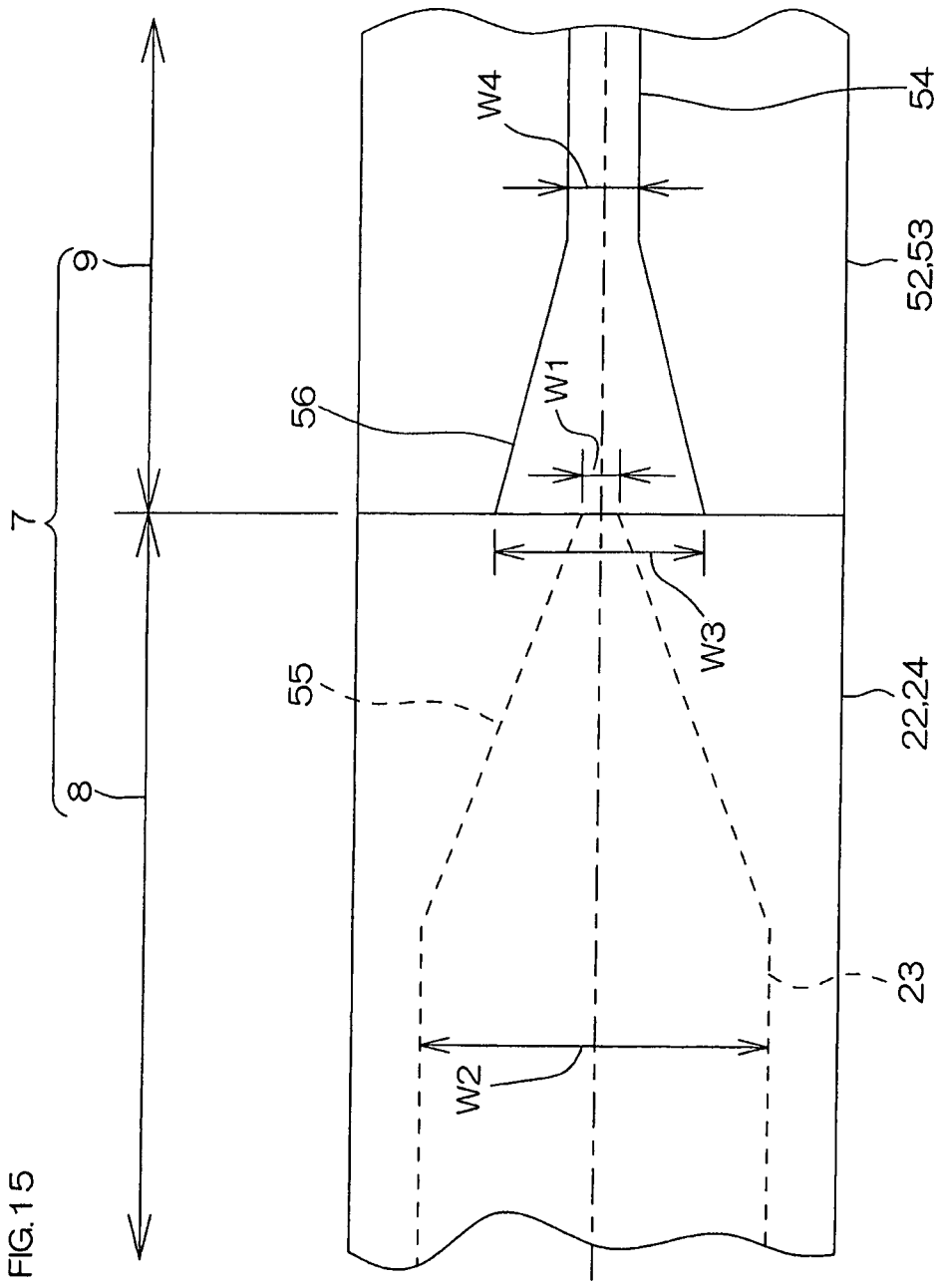
FIG. 15 is an enlarged plan view illustrating the connecting condition of the first optical waveguide and the secondary optical waveguide of another embodiment (an embodiment in which the width in the middle of the front-to-rear direction of the first core layer is larger than that of the secondary over clad layer) of the suspension board with circuit according to the present invention.

FIG. 11 is a sectional view illustrating the method of producing a suspension board with circuit of another embodiment according to the present invention; FIG. 12 is a perspective view illustrating positioning of the head slider with respect to the secondary optical waveguide (an embodiment in which a positioning mark is not formed); FIGS. 13 and 14 are enlarged plan views illustrating the first optical waveguide (an embodiment in which the width of the first core layer in a secondary curved portion and a secondary linear portion is gradually reduced toward the front side) of the suspension board with circuit of another embodiment according to the present invention; and FIG. 15 is an enlarged plan view illustrating the connecting condition of the first optical waveguide and the secondary optical waveguide of another embodiment (an embodiment in which the width in the middle of the front-to-rear direction of the first core layer is larger than that of the secondary over clad layer) of the suspension board with circuit according to the present invention.

In each figure to be described below, the same reference numerals are provided for members corresponding to each of those described above, and their detailed description is omitted.

In the above-mentioned description, the optical waveguide 7 is formed in a pattern on the circuit board 2. However, for example, as shown in FIG. 11, the optical waveguide 7 which has been formed in a pattern beforehand can be disposed on the circuit board 2.

In that case, the optical waveguide 7 is formed in the above-mentioned pattern under a supporting board which is not shown, and is then fixed on the circuit board 2 via an adhesive or the like as required. Thereafter, the supporting board is removed.

In the above-mentioned description, the positioning marks 50 are used for positioning relative to the optical waveguide 19. However, for example, as shown in FIG. 12, the front end portion itself of the secondary over clad layer 54 can be used on positioning the near-field light generation portion 35 and the slider-side optical waveguide 34 relative to the optical waveguide 19 without using the positioning marks 50.

In FIG. 12, one slider mark 51 is provided so as to correspond to the front end portion of the secondary over clad layer 54.

The secondary over clad layer 54 has the above-mentioned refractive index, more particularly, has a higher refractive index than air and is formed so as to be included in the secondary core layer 53 in plane view. Therefore, the secondary over clad layer 54 can be reliably visually identified from above.

For this reason, even when the front end portion of the secondary optical waveguide 9 and the slider mark 51 are aligned, the front end portion of the secondary over clad layer 54 can be visually identified through the slider mark 51 with the camera 43. This allows reliable positioning of the head slider 27 relative to the secondary optical waveguide 9.

In the above-mentioned description of FIG. 5 and the right figure of FIG. 7(e), the secondary optical waveguide 9 is formed from a strip loaded optical waveguide in which the secondary over clad layer 54 is exposed to air. However, for example, as shown with phantom lines of the right figure of FIG. 7(e), the secondary over clad layer 54 can be covered with the protective layer 28.

The protective layer 28 is formed on the secondary core layer 53 and covers the secondary over clad layer 54 and the positioning marks 50. The protective layer 28 is formed so that both widthwise end edges thereof are in the same position in plane view as those of the secondary core layer 53.

As a material for forming the protective layer 28, for example, a transparent material is used, specifically, an organic transparent material and an inorganic transparent material are used.

An organic transparent material is a transparent resin and, for example, the same resin material as that for the above-mentioned secondary under clad layer 52 is used. Further, as a transparent resin, a resin material other than the resin materials described above, including cellulose resin such as cellulose diacetate and cellulose triacetate, styrene resin such as polystyrene and acrylonitrile/styrene copolymer (AS resin), polycarbonate resin, polyethylene, polypropylene, polyolefin resin having cyclo structure and norbornene structure, and copolymer resin of these, polyether nitrile resin, polyether ether ketone resin, polyether sulfone resin, polyphenylene sulfide resin, vinyl alcohol resin, polyvinyl chloride resin, vinylidene chloride resin, polyvinyl butyral resin, polyalylate resin, and polyoxymethylene resin is used.

An inorganic transparent material is an inorganic glass and the inorganic glass including, for example, a silica glass and multicomponent glass is used.

A transparent material can be used alone or used in combination with more than two kinds.

As described above, since the protective layer 28 is made of a transparent material, a high level of visibility on visually identifying the positioning marks 50 from above can be ensured and the positioning marks 50 can be visually identified through the protective layer 28 using the camera 43 easily and reliably.

Therefore, the relative position of the secondary path 49 to the positioning marks 50 can be easily and reliably recognized.

As a result, the near-field light generation portion 35 and the slider-side optical waveguide 34 can be accurately positioned relative to the path 49.

In the above-mentioned description of FIG. 4, the first core layer 23 is formed in a taper shape in the front portion of the secondary linear portion 66. However, for example, as shown in FIGS. 13 and 14, a taper shape in which the width gradually becomes narrower over the secondary curved portion 60 and the secondary linear portion 66 can be formed.

In the above-mentioned description of FIG. 4, the width W2 of the first curved portion 59, the first linear portion 57, the secondary curved portion 60, and the rear end edge and the middle of the front-to-rear direction of the secondary linear portion 66 in the first core layer 23, and the width W4 of the middle of the front-to-rear direction and the front end edge of the third linear portion 58 in the secondary over clad layer 54, are formed substantially the same. However, for example, as shown in FIG. 15, the above-mentioned width W2 can be formed larger in width with respect to the above-mentioned width W4.

In that case, the width W2 of the first curved portion 59, the first linear portion 57, the secondary curved portion 60, and the rear end edge and the middle of the front-to-rear direction of the secondary linear portion 66 in the first core layer 23, is in the range of, for example, 1 to 100 μm, or preferably 5 to 50 μm.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A suspension board with circuit comprising:
   a circuit board comprising a metal supporting board, an insulating layer formed on the metal supporting board, and a conductive layer formed on the insulating layer; and
   an optical waveguide provided in the circuit board;
   wherein the optical waveguide comprises: a first optical waveguide including a curved portion, and a secondary optical waveguide including a linear portion;
   wherein the first optical waveguide comprises:
   a first under clad layer, and
   a first core layer formed on the first under clad layer and included in the first under clad layer when projected in the thickness direction of the first under clad layer, and
   a first over clad layer formed on the first under clad layer to cover the first core layer;
   wherein the secondary optical waveguide comprises:
   a secondary under clad layer, and
   a secondary core layer formed on the secondary under clad layer, and
   a secondary over clad layer formed on the secondary core layer and included in the secondary core layer when projected in the thickness direction of the secondary core layer; and
   wherein the circuit board is provided with a slider mounting portion including a mounting portion as a region for mounting a head slider, and
   wherein at least a part of the secondary optical waveguide is arranged in the slider mounting portion.

2. The suspension board with circuit according to claim 1, wherein at least the first optical waveguide is formed from a flexible material.

3. The suspension board with circuit according to claim 2, wherein the secondary optical waveguide is formed from a flexible material.

4. The suspension board with circuit according to claim 1, wherein the optical waveguide extends in the lengthwise direction, and the curved portion curves in an orthogonal direction with respect to the lengthwise direction and the thickness direction thereof, and the radius of curvature thereof is 100 mm or less.

5. The suspension board with circuit according to claim 4, wherein the length in the orthogonal direction of the end edge at the secondary optical waveguide side of the first core layer is 5 μm or less, and the length in the orthogonal direction at the first optical waveguide side of the secondary over clad layer is 25 μm or more.

6. The suspension board with circuit according to claim 5, wherein the first optical waveguide and the secondary optical waveguide are optically connected in the lengthwise direction by arranging these next to each other in the lengthwise direction, and the end portion at the secondary optical waveguide side of the first core layer is formed in a state that the length in the widthwise direction thereof becomes narrower as coming closer to the secondary optical waveguide when projected in the thickness direction, and the end portion at the first optical waveguide side of the secondary over clad layer is formed in a state that the length in the widthwise direction thereof becomes larger as coming closer to the first optical waveguide when projected in the thickness direction.

* * * * *